United States Patent
Bouda et al.

(10) Patent No.: US 7,949,256 B2
(45) Date of Patent: May 24, 2011

(54) METHOD AND SYSTEM FOR INCREASING DOWNSTREAM BANDWIDTH IN AN OPTICAL NETWORK

(75) Inventors: Martin Bouda, Plano, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 550 days.

(21) Appl. No.: 11/620,144

(22) Filed: Jan. 5, 2007

(65) Prior Publication Data

US 2007/0166043 A1    Jul. 19, 2007

Related U.S. Application Data

(60) Provisional application No. 60/756,925, filed on Jan. 6, 2006.

(51) Int. Cl.
*H04J 14/00* (2006.01)

(52) U.S. Cl. .............................................. 398/66; 398/72

(58) Field of Classification Search ............... 398/66, 398/67, 68, 69, 70, 71, 72
See application file for complete search history.

(56) References Cited

U.S. PATENT DOCUMENTS

| | | | |
|---|---|---|---|
| 4,555,810 A | 11/1985 | Khoe et al. | |
| 5,285,305 A | 2/1994 | Cohen et al. | |
| 5,321,541 A | 6/1994 | Cohen | |
| 5,440,416 A | 8/1995 | Cohen et al. | |
| 5,517,232 A * | 5/1996 | Heidemann et al. | 725/98 |
| 5,579,421 A | 11/1996 | Duvall et al. | |
| 5,694,234 A | 12/1997 | Darcie et al. | |
| 5,926,298 A | 7/1999 | Li | |
| 6,144,472 A | 11/2000 | Knox | |
| 6,163,637 A | 12/2000 | Zirngibl | |
| 6,411,410 B1 | 6/2002 | Wright et al. | |
| 6,498,876 B1 | 12/2002 | Liu et al. | |
| 6,767,139 B2 | 7/2004 | Brun et al. | |
| 7,116,861 B2 * | 10/2006 | Welch et al. | 385/24 |
| 7,245,829 B1 | 7/2007 | Sindile | |
| 7,366,415 B2 | 4/2008 | Lee et al. | 398/66 |
| 7,389,048 B2 | 6/2008 | Kani et al. | |

(Continued)

FOREIGN PATENT DOCUMENTS

EP    1 028 331 A2    8/2000

(Continued)

OTHER PUBLICATIONS

Son et al., "Bidirectional WDM Passive Optical Network for Simultaneous Transmission of Data and Digital Broadcast Video Service," Journal of Lightwave Technology, vol. 21, No. 8, Aug. 2003, pp. 1723-1727.

(Continued)

*Primary Examiner* — Nathan M Curs
(74) *Attorney, Agent, or Firm* — Baker Botts L.L.P.

(57) ABSTRACT

A method is provided for increasing downstream bandwidth in an optical network that includes providing a downstream terminal comprising a digital output path and an analog output path. The method also includes receiving a signal comprising at least one wavelength at the downstream terminal. The method further includes selectively processing the signal at the downstream terminal. The signal is selectively processed at the downstream terminal by processing the signal on the analog output path if the signal comprises analog video data and processing the signal on the digital output path if the signal comprises data to be converted to a digital bit stream.

20 Claims, 10 Drawing Sheets

U.S. PATENT DOCUMENTS

| | | | |
|---|---|---|---|
| 7,684,703 B2 | 3/2010 | Harada | 398/68 |
| 2001/0030785 A1* | 10/2001 | Pangrac et al. | 359/125 |
| 2002/0196491 A1 | 12/2002 | Deng et al. | |
| 2003/0002102 A1 | 1/2003 | Khalfallah et al. | |
| 2004/0001718 A1 | 1/2004 | Matthews et al. | |
| 2004/0131357 A1 | 7/2004 | Farmer et al. | |
| 2004/0184806 A1 | 9/2004 | Lee et al. | |
| 2005/0129404 A1 | 6/2005 | Kim et al. | |
| 2005/0158048 A1 | 7/2005 | Sung et al. | 398/66 |
| 2005/0175343 A1 | 8/2005 | Huang et al. | |
| 2005/0175344 A1 | 8/2005 | Huang et al. | |
| 2005/0180689 A1 | 8/2005 | Kozhevnikov et al. | |
| 2006/0056849 A1 | 3/2006 | Pamart et al. | |
| 2006/0067692 A1 | 3/2006 | Park et al. | 398/75 |
| 2006/0115271 A1 | 6/2006 | Hwang et al. | 398/72 |
| 2006/0153567 A1 | 7/2006 | Kim et al. | |
| 2006/0222365 A1 | 10/2006 | Jung et al. | 398/72 |
| 2007/0092249 A1 | 4/2007 | Akasaka et al. | |
| 2007/0092250 A1 | 4/2007 | Bouda et al. | |
| 2007/0092251 A1 | 4/2007 | Bouda et al. | |
| 2007/0092252 A1 | 4/2007 | Bouda et al. | |
| 2007/0092253 A1 | 4/2007 | Bouda | |
| 2007/0092254 A1 | 4/2007 | Bouda | |
| 2007/0092255 A1 | 4/2007 | Bouda | |
| 2007/0166037 A1 | 7/2007 | Bouda et al. | |
| 2007/0166043 A1 | 7/2007 | Bouda | |
| 2007/0183779 A1 | 8/2007 | Bouda | |
| 2007/0280690 A1 | 12/2007 | Bouda | |
| 2007/0280691 A1 | 12/2007 | Bouda | |

FOREIGN PATENT DOCUMENTS

| | | |
|---|---|---|
| EP | 1 130 806 A2 | 9/2001 |
| EP | 1 434 375 A2 | 6/2004 |
| WO | WO 2007/047559 | 4/2007 |
| WO | WO 2007/081748 | 7/2007 |

OTHER PUBLICATIONS

Ching et al., "Passive Optical Networks," Sharing the Fiber, Telecom Equipment-Wireline, Merrill Lynch, May 15, 2001, pp. 1-27.

Kuhlow et al., "AWG-Based Device for a WDM Overlay PON in the 1.5-μm Bank," IEEE Photonics Technology Letters, vol. 11, No. 2, Feb. 1999, pp. 218-220.

Feldman et al., "An Evaluation of Architectures Incorporating Wavelength Division Multiplexing for Broad-Bank Fiber Access," Journal of Lightwave Technology, vol. 16, No. 9, Invited Paper, Sep. 1998, pp. 1546-1559.

Giles et al., "Access PON Using Downstream 1550-nm WDM Routing and Upstream 1300-nm SCMA Combining Through a Fiber-Grating Route," IEEE Photonics Technology Letters, vol. 8, No. 11, Nov. 1996, pp. 1549-1551.

Hilbk et al., "High Capacity WDM Overlay on a Passive Optical Network," Electronic Letters, Nov. 7, 1996, vol. 32, No. 23, pp. 2162-2163.

Inoue et al., "Silica-based Arrayed-Waveguide Grating Circuit as Optical Splitter/Router," Electronic Letters, Apr. 27, 1995, vol. 31, No. 9, pp. 726-727.

Kashima, "Upgrade of Passive Optical Subscriber Network," Journal of Lightwave Technology, vol. 9, No. 1, Jan. 1991, pp. 113-120.

Lin, "Passive Optical Subscriber Loops with Multiaccess," Journal of Lightwave Technology, vol. 7, No. 11, Nov. 1989, pp. 1769-1777.

MOOG Component Group, "(Mems) Singlemode Fiber Optic Switch," FO5935, 2 pages, 2005.

Light Reading—Networking the Telecom Industry, PON & FTTx Update, Introduction, Aug. 8, 2005, *Light Reading*, Aug. 8, 2005, printed from web site Jan. 26, 2006, pp. 1-11.

ITU-T Telecommunication Standardization Sector of ITU-T, G.984.1, "Gigabit-Capable Passive Optical Network (GPON): General Characteristics," Series G: Transmission Systems and Media, Digital Systems and Networks, Digital Sections and Digital Line System—Optical Line Systems for Local and Access Networks, Mar. 2003, 20 pages.

ITU-T Telecommunication Standardization Sector of ITU-T, G.983.1, "Broadband Optical Access Systems Based on Passive Optical Networks (PON)," Series G: Transmission Systems and Media, Digital Systems and Networks, Digital Sections and Digital Line System—Optical Line Systems for Local and Access Networks, 124 pages, Jan. 2005, 123 pages.

ITU-T Telecommunication Standardization Sector of ITU-T, G.983.3, "A Broadband Optical Access System with Increased Service Capability by Wavelength Allocation," Series G: Transmission Systems and Media, Digital Systems and Networks, Digital Sections and Digital Line System—Optical Line Systems for Local and Access Networks, Mar. 2001, 59 pages.

ITU-T Telecommunication Standardization Sector of ITU-T, G.984.3, "Gigabit-Capable Passive Optical Network (G-PON): Transmission Convergence Layer Specification," Series G: Transmission Systems and Media, Digital Systems and Networks, Digital Sections and Digital Line System—Optical Line Systems for Local and Access Networks, Feb. 2004, 116 pages.

ITU-T Telecommunication Standardization Sector of ITU-T, G.984.3, Series G: Study Period 2005-2008, "Updated Revised Amendment 1, : Amendment to Gigabit-Capable Passive Optical Network (G-PON): Transmission Convergence Layer Specification (2004)," pp. 1-39, May 16-27, 2005.

Green, Paul E. Jr., Telecommunications Consultant, "Fiber-to-the-Home White Paper,", Feb. 21, 2003, pp. 1-21.

Park et al.; "Bidirectional Wavelength-Division-Multiplexing Self-Healing Passive Optical Network," Network Research Team, Telecommunications R&D Center, Samsung Electronics; 2005 Optical Society of America, 3 pages, Mar. 6, 2005.

Son et al.; "Survivable Network Architectures for WDM PON;" Korea Advanced Institute of Science and Technology; 2005 Optical Society of America, 3 pages, Mar. 6, 2005.

Smith, Stephen, "Business Class Services Over a GPON Network," Fujitsu Network Communications; 10 pages, Mar. 5, 2006.

Wang et al.; "A Novel Centrally Controlled Protection Scheme for Traffic Restoration in WDM Passive Optical Networks;" IEEE Photonics Technology Letters, vol. 17, No. 3; Mar. 2005, pp. 717-719.

Suzuki et al.; "A Reliable Wide-Area WDM-PON Using Wavelength-Shifted Protection Scheme;" Access Network Service Systems Laboratories, NTT Corporation; 2 pages, Sep. 25, 2005.

ITU—Telecommunication Standardization Sector Study Group 15; "Recommendation G.983.5: A Broadband Optical Access System with Enhanced Survivability (for consent);" Editor, Recommendation G.983.5; 45 pages, Oct. 15, 2001 through Oct. 26, 2001.

Phillips et al.; "Redundancy Strategies for a High Splitting Optically Amplified Passive Optical Network," Journal of Lightwave Technology, vol. 19, No. 2; pp. 137-149, Feb. 2001.

Chan et al.; "A Novel Bidirectional Wavelength Division Multiplexed Passive Optical Network with 1:1 Protection;" Friday Morning, OFC, vol. 2; pp. 779-781, 2003.

Sun et al.; "A Novel Star-Ring Protection Architecture Scheme for WDM Passive Optical Access Networks;" Department of Information Engineering, The Chinese University of Hong Kong; 3 pages, Mar. 6, 2005.

Hirth, Ryan, "1 Gbps to 10 Gbps Migration," Teknovus, Access the Future, IEEE Meeting, Jul. 2006, San Diego, CA, pp. 1-7.

Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007.

Handley et al., "A Comparison of WDM PON Architectures," Proceedings of the European Conference on Network and Optical Communications, Broadband Access and Technology. Amsterdam, IOS Press, NL, vol. part I, pp. 141-147, Jan. 1, 1999.

International Searching Authority, "Notification of Transmittal of the International Search Report and the Written Opinion of the International Searching Authority, or the Declaration," (PCT Rule 44.1), International Application No. PCT/US2006/040318, mailed Feb. 14, 2007, 13 pages.

International Searching Authority, "Notification of Transmittal of the International Search Report and the Written Opinion of the International Searching Authority, or the Declaration," (PCT Rule 44.1), International Application No. PCT/US2006/040330, mailed Feb. 19, 2007, 13 pages.

International Searching Authority, "Notification of Transmittal of the International Search Report and the Written Opinion of the International Searching Authority, or the Declaration," (PCT Rule 44.1), International Application No. PCT/US2006/040605, 14 pages, mailed Feb. 14, 2007, 14 pages.

Bouda, "A Hybrid Passive Optical Network Using Shared Wavelengths," filed Feb. 3, 2006, 64 pps., 9 pps. drawings, U.S. Appl. No. 11/347,434.

Bouda, "A Distribution Node for a Wavelength-Sharing Network," filed Feb. 3, 2006, 64 pps., 9 pps. drawings, U.S. Appl. No. 11/347,612.

Bouda et al., "Distribution Components for a Wavelength-Sharing Network," filed Feb. 3, 2006, 69 pps., 9 pps. drawings, U.S. Appl. No. 11/347,585.

Bouda et al., "Upgradeable Passive Optical Network," filed Feb. 3, 2006, 66 pps, 9 pps. drawings, U.S. Appl. No. 11/347,446.

Palacharla et al., "System and Method for Managing Network Components in a Hybrid Passive Optical Network," filed Oct. 25, 2006, 43 pps, 4 drawings U.S. Appl. No. 11/552,696.

Bouda, "System and Method for Transmitting Traffic in a Plurality of Passive Optical Networks," U.S. Appl. No. 11/627,809, filed Jan. 26, 2007, 35 pps., 5 pps. drawings.

Bouda, "System and Method for Transmitting Upstream Traffic in an Optical Network," U.S. Appl. No. 11/426,875, filed Jun. 27, 2006, 49 pps., 5 pps. drawings.

Bouda, "System and Method for Managing Different Transmission Architectures in a Passive Optical Network," U.S. Appl. No. 11/627,793, 42 pps., 4 pps. drawings.

Bouda, "System and Method for Distributing Traffic in an Optical Network," U.S. Appl. No. 11/426,879, filed Jun. 27, 2006, 43 pps., 5 pps. drawings.

Akasaka et al., "System and Method for Traffic Distribution in an Optical Network," U.S. Appl. No. 11/426,884, filed Jun. 27, 2006, 71 pps., 12 pps. drawings.

Bouda et al., "Method and System for Increasing Downstream Bandwidth in an Optical Network," filed Jan. 5, 2007, 42 pps., 10 pps. drawings, U.S. Appl. No. 11/620,144.

Bouda, "Distribution Node for an Optical Network," filed Jan. 4, 2007, 38 pps., 6 pps. drawings, U.S. Appl. No. 11/619,945.

Akasaka et al., "System and Method for Protecting an Optical Network," filed Dec. 11, 2006, 42 pps., 4 pps. drawings, U.S. Appl. No. 11/609,120.

Bouda et al., "System and Method for Extending Reach in a Passive Optical Network," filed Jan. 31, 2007, 51 pps, 5 pps. drawings, U.S. Appl. No. 11/669,657.

Bouda, "System and Method for Transmitting Optical Markers in a Passive Optical Network System," 52 pps., 5 pps. drawings, filed Jan. 31, 2007, U.S. Appl. No. 11/669,667.

International Searching Authority, "Notification of Transmittal of the International Search Report and the Written Opinion of the International Searching Authority, or the Declaration," (PCT Rule 44.1), International Application No. PCT/US2006/042224, mailed Mar. 5, 2007, 13 pages.

International Searching Authority, "Notification of Transmittal of the International Search Report and the Written Opinion of the International Searching Authority, or the Declaration," (PCT Rule 44.1), International Application No. PCT/US2006/040597, mailed Mar. 5, 2007, 15 pages.

International Searching Authority, "Notification of Transmittal of the International Search Report and the Written Opinion of the International Searching Authority, or the Declaration," (PCT Rule 44.1), International Application No. PCT/US2006/042220, mailed Mar. 12, 2007, 12 pages.

Zang et al., "A Review of Routing and Wavelength Assignment Approaches for Wavelength-Routed Optical WDM Networks," Optical Networks Magazine, SPIE, Bellingham, WA, US, vol. 1, No. 1, Jan. 2000, pp. 47-60.

Bouda, "System and Method for Protecting an Optical Network," U.S. Appl. No. 11/680,186, filed Feb. 28, 2007, 35 pps., 6 pps. drawings.

International Searching Authority, "Notification of Transmittal of the International Search Report and the Written Opinion of the International Searching Authority, or the Declaration," (PCT Rule 44.1), International Application No. PCT/US2006/043188, mailed Mar. 14, 2007, 12 pages.

Langer et al, "Promising Evolution Paths for Passive Optical Access Networks," Proceedings of 2004 6th International Conference on Warsaw, Poland, Jul. 4, 2004 through Jul. 7, 2004, IEEE vol. 1, pp. 202-207.

International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

Wagner et al., "Technology and System Issues for a WDM-Based Fiber Loop Architecture," Journal of Lightwave Technology, IEEE Service Center, New York, NY, vol. 7, No. 11, Nov. 1, 1989, pp. 1759-1768.

Frigo et al., "A Wavelength-Division Multiplexed Passive Optical Network with Cost-Shared Components," IEEE Photonics Technology Letters, IEEE Service Center, Piscataway, NJ, vol. 4, No. 11, Nov. 1, 1994, pp. 1365-1367.

Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 8, 1988, pp. 1574-1578.

International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.

Asatani et al., "A Field Trial of Fiber Optic Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.

Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.

Palacharla et al.., System and Method for Managing Communication in a Hybrid Passive Optical Network, filed May 2, 2007, U.S. Appl. No. 11/743,311, 50 pages, 6 pages of drawings.

International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.

International Searching Authority, "Notification of Transmittal of the International Search Report and the Written Opinion of the International Searching Authority, or the Declaration," (PCT Rule 44.1), International Application No. PCT/US2007/002851, mailed Aug. 21, 2007, 11 pages.

European Patent Office, European Search Report and Office Action, Application No. 07010686-9-2415, mailed Aug. 21, 2007, 14 pages.

Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.

* cited by examiner

METHOD AND SYSTEM FOR INCREASING DOWNSTREAM BANDWIDTH IN AN OPTICAL NETWORK

CROSS-REFERENCE TO RELATED APPLICATIONS

This application claims benefit under 35 U.S.C. §119(e) of U.S. Provisional Application Ser. No. 60/756,925 filed Jan. 6, 2006 by Bouda, et. al, and entitled Hybrid Passive Optical Network Components.

TECHNICAL FIELD OF THE INVENTION

The present invention relates generally to optical networks and, more particularly, to a method and system for increasing downstream bandwidth in an optical network.

BACKGROUND

In recent years, a bottleneck of communication networks has occurred in the portion of the network known as the access network. Bandwidth on long haul optical networks has increased sharply through new technologies such as wavelength division multiplexing (WDM) and transmission of traffic at greater bit rates. Metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the Internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast to optical network units (ONUs). In the upstream direction, ONUs typically timeshare transmission of traffic in one wavelength. An ONU refers to a form of access node that converts optical signals transmitted via fiber to electrical signals that can be transmitted to individual subscribers and vice versa. PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (Gb/s) by using more powerful transmitters, providing even greater bandwidth. Other PSPONs include, for example, asynchronous transfer mode PONs (APONs) and gigabit Ethernet PONs (GE-PONs).

Although PSPON systems provide increased bandwidth in access networks, demand continues to grow for higher bandwidth. One solution, wavelength division multiplexing PON (WDMPON), would increase downstream (and upstream) capacity dramatically but inefficiently. WDMPONs refer to access networks in which each ONU receives and transmits traffic over a dedicated downstream and upstream wavelength, respectively. Although WDMPONs would increase capacity dramatically, they would do so at a prohibitively high cost for many operators and would supply capacity far exceeding current or near-future demand.

SUMMARY

In accordance with the teachings of the present invention, a method for increasing downstream bandwidth in an optical network includes providing a downstream terminal comprising a digital output path and an analog output path. The method also includes receiving a signal comprising at least one wavelength at the downstream terminal. The method further includes selectively processing the signal at the downstream terminal. The signal is selectively processed at the downstream terminal by processing the signal on the analog output path if the signal comprises analog video data and processing the signal on the digital output path if the signal comprises data to be converted to a digital bit stream.

Technical advantages of particular embodiments of the present invention include a method and system for increasing downstream bandwidth in an optical network that avoids the cost and unreliability of WDMPONs by using a more cost-efficient variation of WDMPON features and components for transmission in the downstream direction. In these embodiments, OLTs may transmit multiple downstream signals in the wavelength band designated for analog video traffic. Groups of ONUs may share one or more of the downstream WDM wavelengths, allowing for greater capacity in the optical network.

Further technical advantages of particular embodiments of the present invention include a method and system for increasing downstream bandwidth in an optical network that allows customers that presently support analog traffic to increase optical bandwidth in the future. These embodiments may allow full re-use of typical optical components at each ONU. By reusing optical components, these embodiments may avoid the cost of new equipment and labor.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
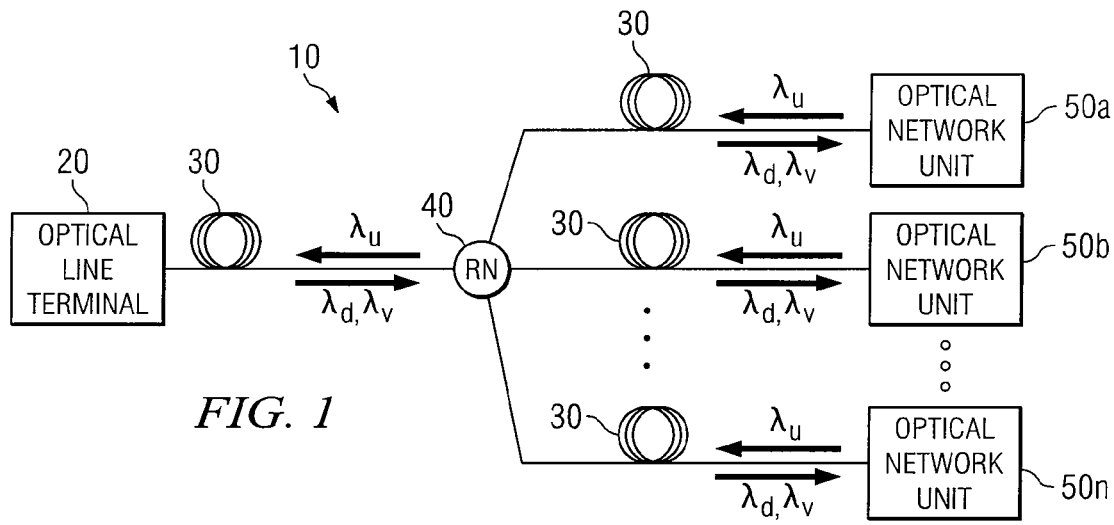
FIG. 1 is a diagram illustrating an example power splitting PON (PSPON)

FIG. 1 is a diagram illustrating an example Power Splitting Passive Optical Network (PSPON) 10. Typically, PSPONs have been employed to address the bottleneck of communications networks in the portion of the network known as the access network. In recent years, bandwidth on long haul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the Internet.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (KB/s) and 1.5 megabits per second (MD/s). Conversely, BPONs are currently being deployed to provide hundreds of megabits per second capacity shared by thirty-two users. GPONs, which typically operate at speeds of up to 2.5 gigabits per second (GB/s) by using more powerful transmitters, provide even greater bandwidth.

Referring back to PSPON 10 of FIG. 1, PSPON 10 includes an Optical Line Terminal (OLT) 20, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a broadband PON (BPON), a gigabit PON (GPON), a gigabit Ethernet PON (GEPON), or any other suitable PSPON. A feature common to all PSPONs 10 is that the outside fiber plant is completely passive.

OLT 20 (which may be an example of an upstream terminal) may reside at the carrier's central office (where it may be coupled to a larger communication network) and includes a transmitter operable to transmit traffic in a downstream wavelength, such as $\lambda_d$, for broadcast to all ONUs 50, which may reside at or near customer sites. OLT 20 may also include a transmitter operable to transmit traffic in a second downstream wavelength $\lambda_v$ (which may be added to $\lambda_d$) for broadcast to all ONUs 50. As an example, in typical GPONs, $\lambda_v$ may carry analog video traffic. Alternatively, $\lambda_v$ may carry digital data traffic. OLT 20 also includes a receiver operable to receive traffic from all ONUs 50 in a time-shared upstream wavelength, $\lambda_u$. In typical PSPONs, downstream traffic in $\lambda_d$ and $\lambda_v$ is transmitted at a greater bit rate than is traffic in $\lambda_u$, as PSPONs typically provide lower upstream bandwidth than downstream bandwidth. It should be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal).

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers. RN 40 of PSPON 10 (which may also generally be referred to as a distribution node) comprises any suitable power splitter, such as an optical coupler, and connects OLT 20 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 20.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers. Subscribers may include residential and/or commercial customers. Typically, PONs 10 have thirty-two ONUs 50 per OLT 20, and thus, many example PONs may be described as including this number of ONUs. However, any suitable number of ONUs per OLT may be provided. ONUs 50 may include triplexers that comprise two receivers to receive downstream traffic (one for traffic in $\lambda_d$ and the other for traffic in $\lambda_v$) and one transmitter to transmit upstream traffic in $\lambda_u$. The transmission rate of the ONU transmitter is typically less than the transmission rate of the OLT transmitter (due to less demand for upstream capacity than for downstream capacity). Each ONU 50 is operable to process its designated downstream traffic and to transmit upstream traffic according to an appropriate time-sharing protocol (such that the traffic transmitted by one ONU in $\lambda_u$ does not collide with the traffic of other ONUs in $\lambda_u$).

In operation, the OLT 20 of a typical PSPON 10 transmits downstream traffic destined for one or more of ONUs 50 in $\lambda_d$. OLT 20 may also transmit downstream analog video traffic for broadcast to ONUs 50 in $\lambda_v$. Traffic in wavelengths $\lambda_d$ and $\lambda_v$ is combined at OLT 20 and travels over optical fiber 30 to RN 40. RN 40 splits the downstream traffic into a suitable number of copies and forwards each copy to a corresponding ONU. Each ONU receives a copy of the downstream traffic in $\lambda_d$ and $\lambda_v$ and processes the signal. Suitable addressing schemes may be used to identify which traffic is destined for which ONU 50. Each ONU 50 may also transmit upstream traffic in $\lambda_u$ along fiber 30 according to a suitable time-sharing protocol (such that upstream traffic does not collide). RN 40 receives the upstream traffic from each ONU 50 and combines the traffic from each ONU 50 into one signal. RN 40 forwards the signal over fiber 30 to OLT 20. OLT 20 receives the signal and processes it.

Although PSPONs may offer much greater bandwidth than typical access networks such as DSL networks, bandwidth requirements are projected to exceed even the increased capacity offered by typical PSPONs. For example, some streaming video and online gaming applications presently require bit rates of approximately one to ten MB/s, and some IP high definition television and video-on-demand systems presently require bit rates of approximately twenty MB/s. Future demands for bandwidth are projected to be even greater.

A switch to a wavelength division multiplexing PON (WDMPON), in which each ONU would receive and transmit traffic over a dedicated downstream and upstream wavelength, may dramatically increase bandwidth at the access network by multiplying network capacity by the number of wavelengths carried. However, the increase in bandwidth using WDMPONs comes at a significant cost. For example, WDMPONs require highly stable WDM components to distribute narrowly spaced dedicated wavelengths (or channels) from the OLT to each ONU and from each ONU to the OLT. For example, the multiplexer/demultiplexer at RN 140 and the receivers and transmitter at each ONU 150 must all be precisely tuned. In practice, the density of the channels requires wavelength stabilized transmitters and temperature insensitive multiplexers, both of which add significantly to the cost of the network. Many WDMPON components (including colorless ONUs) are also expensive and as-of-now unproven technologies whose reliability has not been determined. Thus, according to some estimates, implementing a WDMPON may cost two to five times as much as a GPON and WDMPON may be unreliable.

Figure 2:
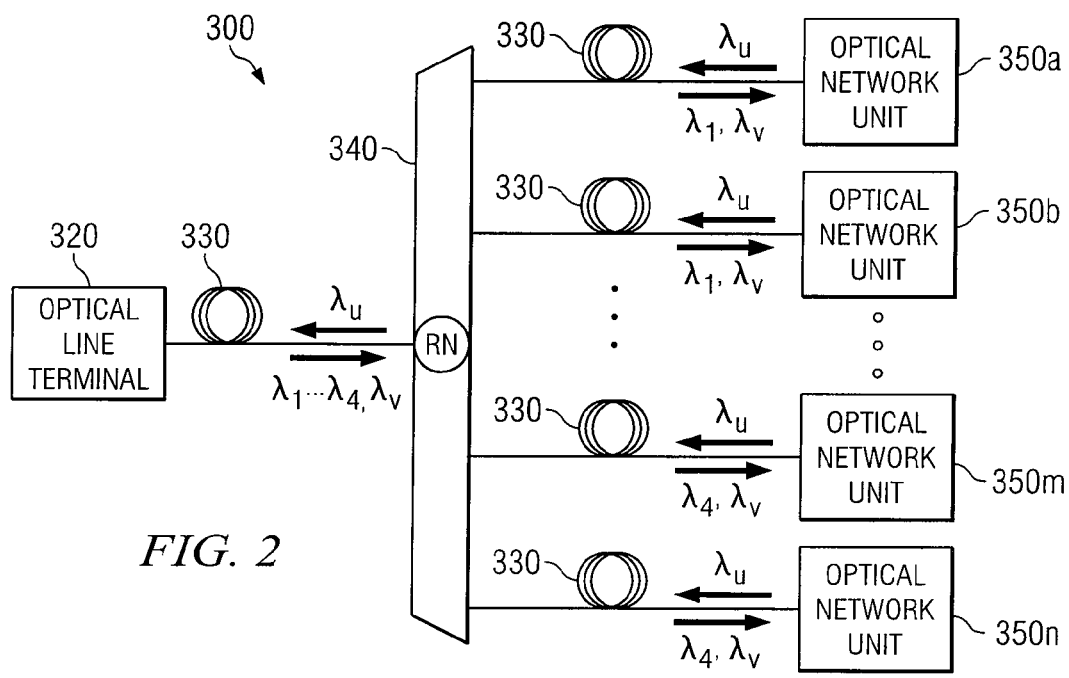
FIG. 2 is a diagram illustrating an example Wavelength Shared Hybrid PON (HPON)

FIG. 2 is a diagram illustrating an example hybrid PON (HPON) 300. Example HPON 300 comprises OLT 320, optical fiber 330, RN 340, and ONUs 350. Example HPON 300, a hybrid between a PSPON and a WDMPON, provides a more cost-efficient solution for many network operators. Example HPON 300 provides greater downstream capacity without incurring many of the costs of WDMPON by having groups of two or more ONUs 350 share downstream WDM wavelengths, thus reducing the need for densely multiplexed wavelengths and the need for highly stable multiplexers and transceivers. It should be noted that an HPON generally refers to any suitable PON that is not a full WDMPON but that is operable to route downstream traffic in particular wavelengths to particular ONUs (and to transmit upstream traffic in any suitable manner). An HPON may include both an HPON that transmits downstream traffic in a plurality of wavelengths each shared by a group of wavelength-sharing ONUs (a WS-HPON) and an HPON that transmits downstream traffic in a unique wavelength for each ONU (retaining PSPON characteristics in the upstream direction).

In the illustrated example, ONUs 350a-350n may share $\lambda_1$-$\lambda_4$. Traffic in $\lambda_v$ is broadcast to all ONUs. It should be noted that any suitable number of ONUs may be associated with one OLT. Additionally, any suitable number of ONUs may share one or more wavelengths in a HPON. Using shared wavelengths in HPON permits the use of less costly optics components (such as, for example, low-cost CWDM optics), allowing for increased capacity at a lower cost than WDMPON.

For example, sharing downstream wavelengths in HPON 300 reduces the cost and stability requirements of the multiplexer and transmitter/receiver components in the network. Due to the sharing of wavelengths, the spacing between WDM wavelengths may be increased to relax the specifications of wavelength selective elements and to relax the requirements for transmitter wavelength stability and temperature stability of passive components. By using less expensive components to provide a desired increase in downstream bandwidth, HPON 300 is a much more attractive solution for many network operators.

OLT 320 of HPON 300 (which may be an example of an upstream terminal) may reside at the carrier's central office and comprises four transmitters operable to transmit downstream traffic in $\lambda_1$-$\lambda_4$, which are to be shared by groups of ONUs 350. OLT 320 may also comprise an additional transmitter operable to transmit an analog video signal in $\lambda_v$ for broadcast to all ONUs 350. OLT 320 may also comprise a multiplexer operable to multiplex the wavelengths transmitted by the transmitters of OLT 320. OLT 320 may also comprise a receiver operable to receive upstream traffic in wavelength $\lambda_u$, which is time-shared by ONUs 350. It should be noted that although the illustrated embodiment shows only four downstream wavelengths to be shared by ONUs 350, any suitable number of downstream wavelengths may be transmitted at OLT 320 and shared by groups of ONUs 350. In addition, any suitable number of downstream wavelengths may be transmitted at OLT 320 and the traffic in these wavelengths broadcast to all ONUs 350 (and not just the traffic in $\lambda_v$, as illustrated). It should be further noted that traffic in any suitable number of upstream wavelengths may be received at OLT 320 (including traffic in multiple sub-bands of $\lambda_u$) and an upstream wavelength need not be time-shared by all ONUs (for example, a separate upstream wavelength may be time-shared by each group of downstream, wavelength-sharing ONUs).

Optical fiber 330 may comprise any suitable fiber to carry upstream and downstream traffic. In certain Phones 300, optical fiber 330 may comprise, for example, bidirectional fiber. In other Phones 300, optical fiber 330 may comprise two distinct fibers.

RN 340 of HPON 300 may comprise a multiplexer and a power splitter. The multiplexer is operable to demultiplex downstream wavelengths $\lambda_1$-$\lambda_4$ and forward traffic in each of these wavelengths to a corresponding group of wavelength-sharing ONUs 350. The power splitter is operable to receive and split traffic in downstream wavelength $\lambda_v$ (if applicable) for broadcast to all ONUs 350. With regard to upstream traffic, the power splitter of RN 340 is also operable to receive and combine traffic in time-shared $\lambda_u$ from ONUs 350 into one signal. RN 340 is further operable to forward the upstream signal to OLT 320. It should be noted that although RN 340 is referred to as a remote node, "remote" refers to RN 340 being communicatively coupled to OLT 320 and ONUs 350 in any suitable spatial arrangement. A remote node may also generally be referred to as a distribution node.

ONUs 350 (which may be examples of downstream terminals) may comprise any suitable optical network unit or ONT and may serve residential and/or commercial customers. There may be any suitable number of ONUs. Each ONU 350 may comprise one receiver to receive traffic over a shared wavelength, one of $\lambda_1$-$\lambda_4$, and one receiver to receive traffic in $\lambda_v$ (if applicable). Each ONU 350 may also comprise one transmitter to transmit upstream traffic over time-shared $\lambda_u$. Each ONU 350 may thus comprise a triplexer.

In operation, the transmitters in OLT 320 transmit downstream traffic in $\lambda_1$-$\lambda_4$, which are to be shared by groups of ONUs 350, and (in certain cases) one transmitter in OLT 320 transmits downstream traffic to be broadcast to all ONUs 350 over $\lambda_v$. Traffic in wavelengths $\lambda_1$-$\lambda_4$ and $\lambda_v$ is multiplexed at OLT 320 into one signal, and the signal travels over optical fiber 330 to RN 340. RN 340 filters the traffic in $\lambda_v$ out of the signal and forwards the traffic to the power splitter where it is split for broadcast to all ONUs 350. At the multiplexer, RN 340 demultiplexes the signal comprising the traffic in the remaining wavelengths ($\lambda_1$-$\lambda_4$) and forwards the traffic in each wavelength, one of $\lambda_1$-$\lambda_4$, to its corresponding group of wavelength-sharing ONUs 350. Each ONU 350 receives traffic over one or more of the wavelengths that it shares with other ONUs 350 and processes the traffic (according to a suitable protocol). Each ONU 350 may also receive and process traffic in $\lambda_v$. In the upstream direction, each ONU 350 time-shares use of $\lambda_u$ according to a suitable protocol. RN 340 receives upstream traffic carried over time-shared $\lambda_u$ from each of the ONUs 350 and combines the traffic into one signal using the power splitter. RN 340 forwards the combined signal over fiber 330 to OLT 320. OLT 320 receives the signal at its receiver and processes the traffic.

Modifications, additions, or omissions may be made to the HPON 300 described without departing from the scope of the invention. The components of the HPON 300 described may be integrated or separated according to particular needs. Moreover, the operations of the HPON 300 described may be performed by more, fewer, or other components.

Figure 3:
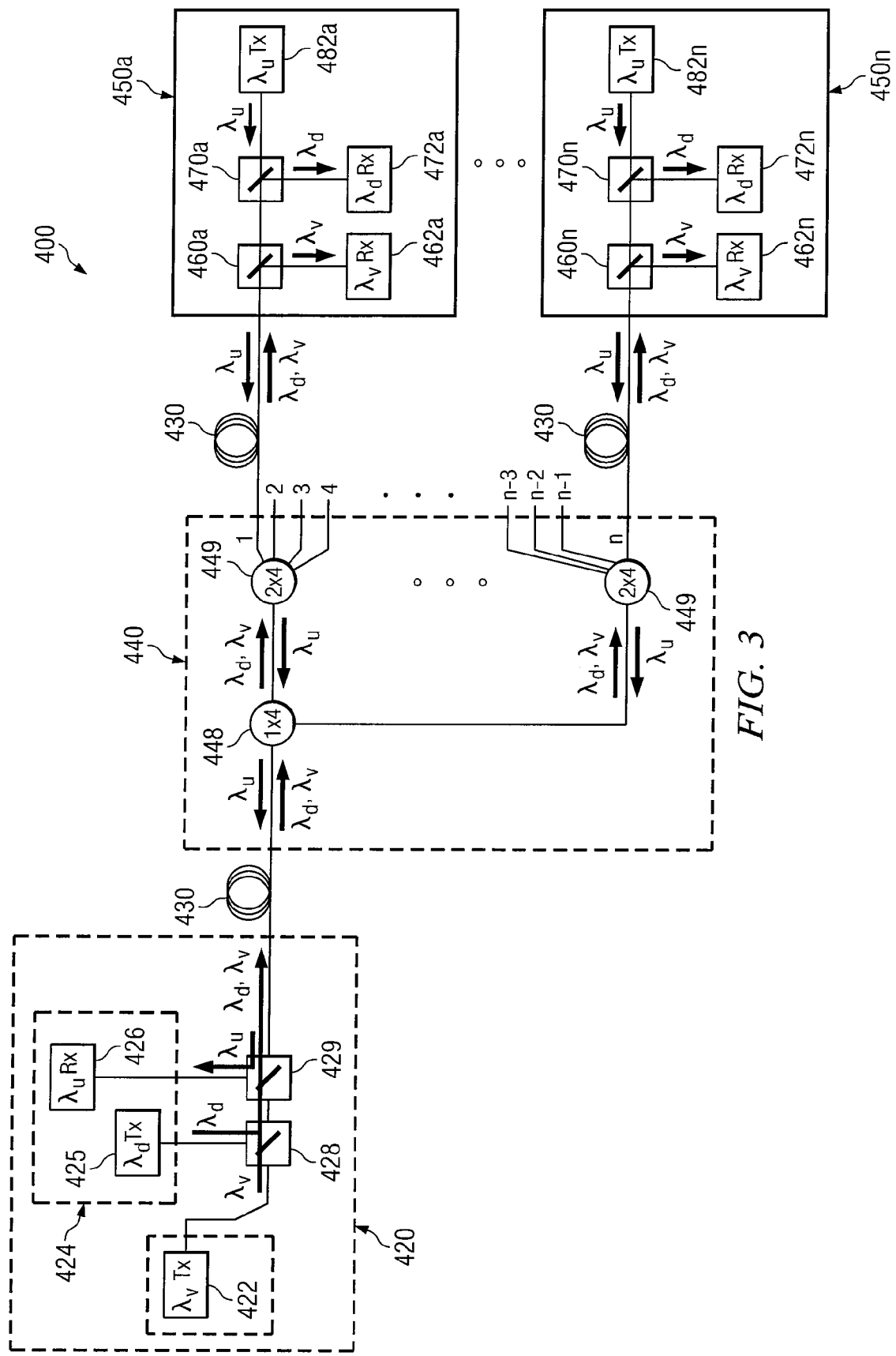
FIG. 3 is a diagram illustrating an example PSPON in more detail.

FIG. 3 is a diagram illustrating an example PSPON 400 in more detail. Example PSPON 400 comprises OLT 420, optical fiber 430, RN 440, and ONUs 450. Referring back to the discussion of PSPONs, PSPONs may transmit downstream traffic over two wavelengths $\lambda_d$ and $\lambda_v$, and upstream traffic over time-shared wavelength $\lambda_u$. The PSPON 400 may be provided for any PSPON such as those described above in conjunction with PSPON 10 of FIG. 1.

OLT 420 of example PSPON 400 (which may be an example of an upstream terminal) comprises a transmitter 422, transceiver 424 comprising transmitter 425 and receiver 426, and filters 428 and 429. Transmitter 422 may comprise any suitable transmitter and is operable to transmit traffic over wavelength $\lambda_v$. Transmitter 422 of typical PSPONs may transmit analog video traffic (although transmitter 422 may alternatively transmit digital data traffic). Transmitter 425 of transceiver 424 may comprise any suitable transmitter operable to transmit traffic over wavelength $\lambda_d$. Transmitter 425 of typical PSPONs may transmit digital data traffic. Transmitters 422 and 425 may transmit at any suitable bit rate. Receiver 426 of transceiver 424 may comprise any suitable receiver operable to receive upstream traffic from ONUs 450 carried over $\lambda_u$. Filter 428 comprises any suitable filter operable to pass the traffic in v and direct the traffic in $\lambda_d$ to RN 440. The traffic in $\lambda_d$ and $\lambda_v$ may also be combined into one signal at filter 428. Filter 429 comprises any suitable filter operable to pass the traffic in downstream wavelengths $\lambda_d$ and $\lambda_v$ to RN 440 and direct the traffic in upstream wavelength $\lambda_u$ to receiver 426.

Optical fiber 430 may comprise any suitable fiber to carry upstream and downstream traffic. In particular example PSPON 400, optical fiber 430 may comprise bidirectional optical fiber. Alternatively, optical fiber 430 may comprise one fiber for downstream traffic and one fiber for upstream traffic.

RN 440 comprises a primary power splitter 448 and secondary power splitters 449. Primary power splitter 448 comprises any suitable power splitter, such as an optical coupler, and is operable to split a downstream optical signal into a suitable number of copies and to combine a plurality of upstream optical signals into one signal. In the illustrated example, primary power splitter 448 is operable to broadcast the traffic in $\lambda_d$ and $\lambda_v$ by splitting the downstream signal comprising these wavelengths into four copies (which are then forwarded to secondary power splitters 449 for eventual receipt by all ONUs 450). Primary power splitter 448 is also operable to combine upstream traffic transmitted over $\lambda_u$ by ONUs 450 into one signal. Although primary power splitter 448 is illustrated as a 1×4 power splitter, primary power splitter 448 may comprise any suitable splitter or combination of splitters such that each ONU 450 receives a copy of the traffic in $\lambda_d$ and $\lambda_v$ and such that the upstream signals from ONUs 450 are combined for communication to OLT 420. A wavelength router and a power splitter may each be members of a group referred to as distributors.

Each secondary power splitter 449 comprises any suitable power splitter, such as an optical coupler or combination of couplers, operable to split a downstream signal and combine an upstream signal. In the downstream direction, each secondary power splitter 449 is operable to receive a signal from primary power splitter 448 and distribute the combined signal to a corresponding group of ONUs 450. In addition, a multiplexer may be added to the network as described in more detail below and secondary power splitters 449 may receive a signal from primary power splitter 448 and the multiplexer. In the upstream direction, each secondary power splitter 449 is operable to receive and combine traffic over time-shared $\lambda_u$ from a corresponding group of ONUs 450, and distribute one copy to primary power splitter 448. It should be noted that although secondary power splitters 449 are represented by 2×4 couplers in the illustrated example, any suitable coupler (or combination of couplers) may be used.

Each ONU 450 (which may be an example of a downstream terminal) may comprise any suitable ONU or ONT. In the illustrated example network, ONU 450 comprises a filter 460, a receiver 462, a filter 470, a receiver 472, and a transmitter 482. Since each ONU 450 in the illustrated example comprises two receivers and one transmitter, it may be referred to as a triplexer. However, any suitable number of transmitters and/or receivers may reside at each ONU. For example, if ONU 450 had one receiver and one transmitter, it may be referred to as a diplexer. Each filter 460 may comprise any suitable filter operable to direct traffic in $\lambda_v$ to a corresponding receiver 462 and to pass traffic in $\lambda_d$ in the downstream direction and $\lambda_u$ in the upstream direction. Each receiver 462 may include any suitable receiver operable to receive traffic in $\lambda_v$ from a corresponding filter 460 and process the traffic. Each filter 470 may comprise any suitable filter operable to direct the traffic in $\lambda_d$ to a corresponding receiver 472 and to pass the traffic in $\lambda_u$ in the upstream direction. Each receiver 472 may include any suitable receiver operable to receive the traffic in $\lambda_d$ from a corresponding filter 470 and process the traffic. Each transmitter 482 may comprise any suitable transmitter operable to transmit the traffic in $\lambda_u$ upstream. ONUs 450 may time-share $\lambda_u$ using a suitable communication protocol to avoid collision of upstream traffic. It should be noted that any suitable number of ONUs 450 may be implemented in PSPON 400.

In operation, in the downstream direction, transmitter 422 of OLT 420 may transmit downstream traffic (for example, analog video) over $\lambda_v$, and transmitter 425 may transmit downstream traffic (for example, digital data) over $\lambda_d$. Filter 428 receives the two signals and passes the traffic in $\lambda_v$ and directs the traffic in $\lambda_d$ (thereby combining the traffic into one signal) to filter 429. Filter 429 receives the combined signal comprising the traffic in $\lambda_v$ and $\lambda_d$ and allows the signal to pass over fiber 430 to RN 440. Primary power splitter 448 receives the signal comprising the traffic in $\lambda_d$ and $\lambda_v$, splits the traffic into multiple copies (in this example, four copies), and forwards each copy to a corresponding secondary power splitter 449. Each secondary power splitter 449 receives a copy of the signal comprising the traffic in $\lambda_d$ and $\lambda_v$, splits the copy into multiple additional copies (in this example, four additional copies of each copy), and passes each additional copy over fiber 430 to a corresponding ONU 450. Each ONU 450 receives a copy of the signal comprising the traffic in $\lambda_d$ and $\lambda_v$ at a corresponding filter 460. Each filter 460 passes the traffic in $\lambda_d$ to filter 470 and directs the traffic in $\lambda_v$ to receiver 462.

Filter 470 receives the traffic in $\lambda_d$ and directs it to receiver 472. Receivers 462 and 472 receive and process the traffic in $\lambda_v$ and $\lambda_d$, respectively.

In the upstream direction, transmitter 482 of each ONU 450 transmits traffic over time-shared $\lambda_u$. The traffic in $\lambda_u$ passes through filters 470 and 460 and over fiber 430 to RN 440. RN 440 receives the traffic in $\lambda_u$ from each ONU 450 at a corresponding secondary power splitter 449. Each secondary power splitter 449 splits the signal into two copies, and forwards one copy to primary power splitter 448. Primary power splitter 448 receives a copy of the upstream signal from each secondary power splitter 449, combines the signals into one signal, and forwards the combined signal to OLT 420. The signal travels over fiber 430 to filter 429 of OLT 420. Filter 429 directs the traffic in $\lambda_u$ to receiver 426. Receiver 426 receives the traffic in $\lambda_u$ and processes it.

Modifications, additions, or omissions may be made to the PSPON 400 described without departing from the scope of the invention. The components of the PSPON 400 described may be integrated or separated according to particular needs. Moreover, the operations of the PSPON 400 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 4:
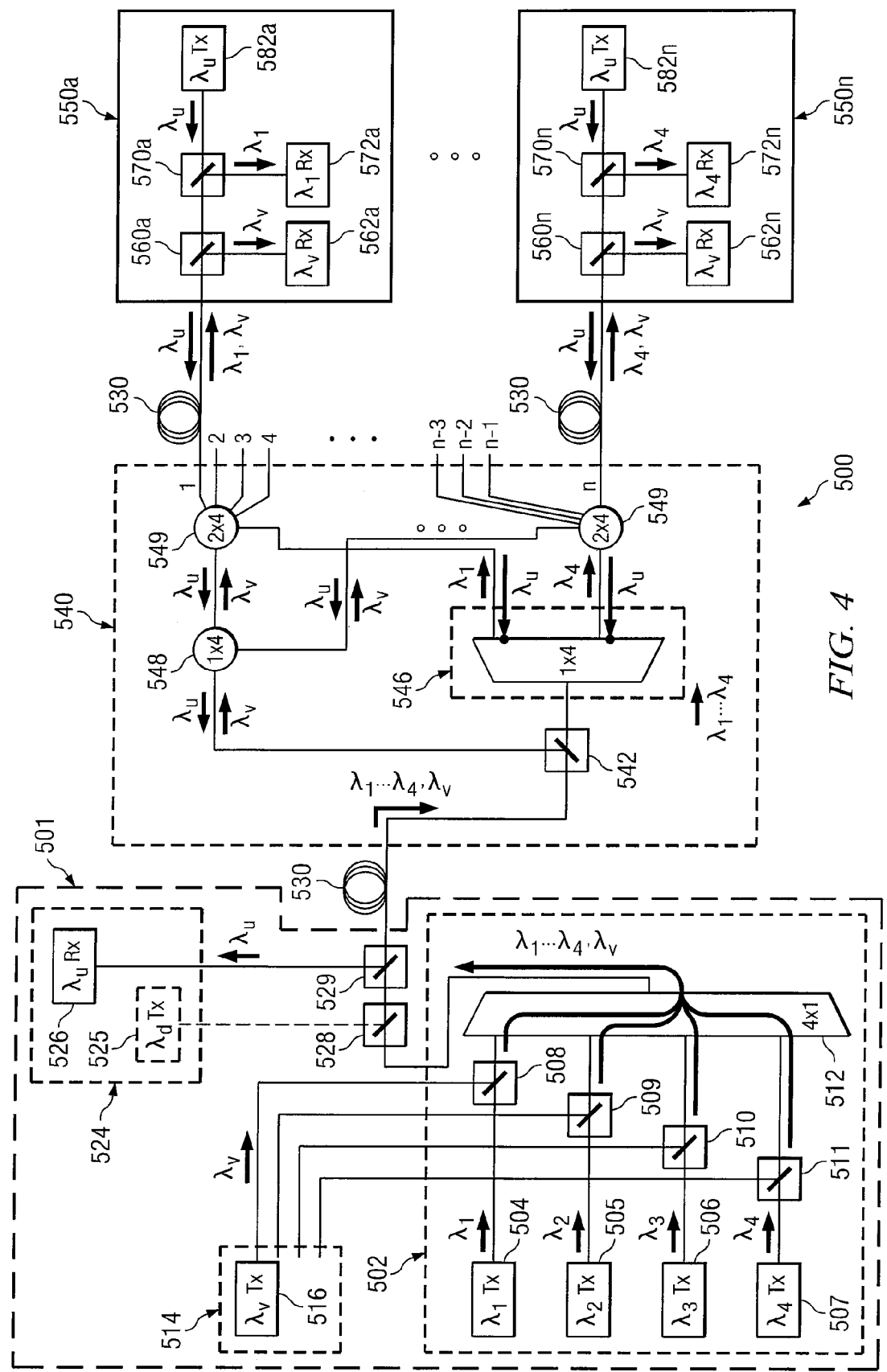
FIG. 4 is a diagram illustrating an example HPON in more detail.

FIG. 4 is a diagram illustrating an example HPON 500 in more detail. The example HPON 500 of FIG. 4 also illustrates additions to PSPON 400 of FIG. 3. As described above, HPONs may be more attractive options than WDMPONs. By sharing downstream WDM wavelengths, HPONs provide an increase in bandwidth over PSPONs at a much lower price than WDMPONs.

HPON 500 comprises OLT 501, fiber 530, RN 540, and ONUs 550. OLT 501 (which may be an example of an upstream terminal) comprises WDM transmission section 502, transmission section 514, PSPON transceiver 524, and filters 528 and 529. WDM transmission section 502 comprises transmitters 504-507, filters 508-511, and multiplexer 512. Each transmitter 504-507 may comprise any suitable transmitter and is operable to transmit traffic over a corresponding wavelength, $\lambda_1$-$\lambda_4$, respectively. It should be noted that although example HPON 500 does not provide WDM for upstream traffic, and thus new receivers are not needed in conjunction with new transmitters 504-507, it may be economical to implement transceivers (transmitter and receiver) in WDM transmission section 502 instead of only transmitters. It should further be noted that although only four new transmitters are illustrated in example HPON 500, any suitable number of transmitters (or transceivers) may be included.

Each filter 508-511 may comprise any suitable filter and is operable to pass the traffic in $\lambda_1$-$\lambda_4$, respectively. In addition, filter 508 is operable to direct the traffic in wavelength $\lambda_v$ from transmitter 516 of transmission section 514 to multiplexer 512 (such that the traffic in both $\lambda_1$ and $\lambda_v$ is forwarded to multiplexer 512 over the same fiber). In fact, each filter 508-511 may be coupled to transmission section 514 (through a corresponding fiber), allowing for more transmitters to be added to HPON 500, as described below in more detail with reference to FIG. 5. The fibers coupling filters 509-511 and transmission section 514 do not carry a signal in the illustrated example HPON 500 of FIG. 4, as no new transmitters have been added to transmission section 514. However, filters 509-511 may be operable to direct the traffic in the corresponding wavelengths associated with potential transmitters added to transmission section 514 in a similar manner as filter 508 directs the traffic in $\lambda_v$.

Transmission section 514 comprises transmitter 516 and a set of three terminating fiber leads. Transmitter 516 comprises any suitable transmitter and is operable to transmit traffic in $\lambda_v$. Transmitter 516 may be the same as transmitter 422 of network 400, and thus $\lambda_v$ of HPON 500 may be the same as $\lambda_v$ of network 400. Transmitter 516 may transmit analog video traffic in $\lambda_v$. The three terminating fiber leads may be coupled to new transmitters if new transmitters are added to example HPON 500. As discussed above, each terminating lead is coupled to a corresponding filter, one of filters 509-511. It should be noted that although only three fiber leads are illustrated, any suitable number of leads may be added.

Multiplexer 512 comprises any suitable multiplexer/demultiplexer (and may be considered a wavelength router) and is operable to combine the traffic in $\lambda_1$-$\lambda_4$ and $\lambda_v$ into one signal. Multiplexer 512 may be a typical N×1 multiplexer operable to receive traffic in one wavelength through each port.

PSPON transceiver 524 comprises transmitter 525 and receiver 526. Transmitter 525 may be the same transmitter as transmitter 425 of FIG. 3. However, in HPON 500 of FIG. 4 transmitter 525 may no longer transmit traffic over the network, and may be replaced by transmitters 504-507 of WDM transmission section 502. Transmitter 525 may, in particular embodiments, remain in place to provide limited protection for failure of the downstream WDM. Receiver 526 of transceiver 524 may comprise any suitable receiver (and may be the same as receiver 426 of network 400) and is operable to receive upstream traffic carried over time-shared $\lambda_u$.

Filter 528 comprises any suitable filter operable to pass the traffic in $\lambda_1$-$\lambda_4$ and $\lambda_v$ to filter 529. Filter 528 may also be operable to pass the traffic in additional wavelengths to be transmitted in HPON 500 (such as the traffic in $\lambda_5$-$\lambda_8$ discussed in conjunction with FIG. 5 below). Filter 529 comprises any suitable filter operable to pass the traffic in $\lambda_1$-$\lambda_v$ and $\lambda_v$ over fiber 530 to RN 540. Filter 528 may also be operable to pass traffic in additional wavelengths to be transmitted in HPON 500 (such as traffic in $\lambda_5$-$\lambda_8$ discussed in conjunction with FIG. 5 below). In addition, filter 529 is operable to direct traffic in upstream wavelength $\lambda_u$ to receiver 526.

Optical fiber 530 may comprise any suitable fiber to carry upstream and downstream traffic. In certain HPONs 500, optical fiber 530 may comprise, for example, bidirectional optical fiber. In other HPONs 500, optical fiber 530 may comprise two distinct fibers, one carrying downstream traffic and the other carrying upstream traffic.

RN 540 comprises filter 542, multiplexer 546, primary power splitter 548, and secondary power splitters 549. RN 540 is operable to receive the traffic in $\lambda_1$-$\lambda_4$ and $\lambda_v$ from OLT 501, filter out and broadcast the traffic in $\lambda_v$, and demultiplex and forward the traffic in $\lambda_1$-$\lambda_v$ to the ONUs in corresponding groups of wavelength-sharing ONUs 550. RN 540 is further operable to receive from ONUs 550 upstream signals carried over time-shared wavelength $\lambda_u$, combine these signals, and forward the combined traffic in $\lambda_u$ to OLT 501. To reiterate, HPON 500 is operable to allow wavelength-sharing among groups of ONUs 550, thereby increasing network capacity while avoiding the costly components of a full downstream WDM network such as WDMPON.

Filter 542 may comprise any suitable filter operable to receive a signal comprising traffic in $\lambda_1$-$\lambda_4$ and $\lambda_v$, pass the traffic in $\lambda_1$-$\lambda_4$ to multiplexer 546, and direct the traffic in $\lambda_v$ to primary power splitter 548. Although filter 542 in the illustrated example includes only one filter, filter 542 may comprise any suitable number of filters. In the upstream direction, filter 542 is operable to receive the traffic in $\lambda_u$ and direct it toward OLT 501.

Multiplexer 546 may include any suitable multiplexer/demultiplexer (and may be considered a wavelength router) and is operable to receive the signal comprising the traffic in $\lambda_1$-$\lambda_4$ and demultiplex the signal. Although in the illustrated example, multiplexer 546 is a 1×4 multiplexer, in alternative networks, multiplexer 546 may have any suitable number of ports. Also, in alternative networks, multiplexer 546 may comprise two or more separate multiplexers receiving downstream signals from one or more upstream sources and forwarding the traffic downstream such that ONUs share wavelengths. In the downstream direction, each output port of multiplexer 546 is operable to forward the traffic in a corresponding one of $\lambda_1$-$\lambda_4$ to a corresponding secondary power splitter 549. In alternative embodiments, the traffic in each wavelength may pass to a different secondary power splitter than that illustrated, the traffic in more than one wavelength may pass to a secondary power splitter, and/or multiplexer 546 may receive, multiplex, and pass traffic in more than four downstream wavelengths.

In the upstream direction, multiplexer 546 may be operable to receive and terminate the traffic in $\lambda_u$ as ONUs 550 of example HPON 500 time-share $\lambda_u$ (and do not transmit traffic over multiple upstream wavelengths). Alternatively, multiplexer 546 may forward this traffic to filter 542 for suitable termination (where termination may be performed internally or externally).

Primary power splitter 548 may comprise any suitable power splitter and may be primary power splitter 448 of network 400. In the illustrated example HPON, primary power splitter 548 is operable to receive the traffic in $\lambda_v$ and split the traffic into four copies. The power of each copy may be less than one-fourth of the power of the original signal $\lambda_v$. Primary power splitter 548 is operable to forward each copy to a corresponding secondary power splitter 549. In the upstream direction, primary power splitter 548 is operable to receive traffic transmitted by ONUs 550 over time-shared $\lambda_u$ from secondary power splitters 549 and combine this traffic into one signal. Primary power splitter 548 forwards the upstream signal to OLT 501. Primary power splitter 548 thus broadcasts the traffic in $\lambda_v$ in the downstream direction and combines traffic over time-shared $\lambda_u$ in the upstream direction. Although primary power splitter 548 is illustrated as a 1×4 power splitter, any suitable power splitter may be used.

Each secondary power splitter 549 may comprise any suitable power splitter, such as an optical coupler, operable to receive a signal from primary power splitter 548 and a signal from multiplexer 546, combine the two signals into one signal, split the combined signal into a suitable number of copies, and forward each copy to the ONUs in a corresponding wavelength-sharing group of ONUs 550 (each group of wavelength-sharing ONUs shares one of $\lambda_1$-$\lambda_v$ in the downstream direction). In the upstream direction, each secondary power splitter 549 is operable to receive traffic transmitted at $\lambda_u$ from each ONU 550 of a corresponding group of ONUs 550 and combine the traffic from each ONU 550 into one signal. Each secondary power splitter 549 is operable to split the combined upstream traffic into two copies and forward one copy to primary power splitter 548 and one copy to multiplexer 546. The copy forwarded to primary power splitter 548, as described above, is combined with other traffic from other ONUs 550 transmitted over time-shared $\lambda_u$. The copy forwarded to multiplexer 546 may be blocked or forwarded to filter 542 for suitable termination. Although secondary power splitters 549 are illustrated as 2×4 couplers in example HPON 500, secondary power splitters 549 may be any suitable coupler or combination of couplers (such as a 2×2 coupler coupled to two 1×2 couplers). Secondary power splitters 549 may split or combine any suitable number of signals.

Each ONU 550 (which may be an example of a downstream terminal) may comprise any suitable ONU or ONT and may be the same as ONU 450 of FIG. 3. ONU 550 of FIG. 4 comprises a filter 560, receiver 562, filter 570, receiver 572, and transmitter 582. Each filter 560 may comprise any suitable filter and may be the same as filter 460 of network 400. Each filter 560 is operable to direct traffic in wavelength $\lambda_v$ (for example, analog video traffic) to receiver 562. Filter 560 is further operable to pass the traffic in the corresponding one of $\lambda_1$-$\lambda_4$ received at the ONU 550 to filter 570 and to pass the traffic in $\lambda_u$ to RN 540 in the upstream direction. Receiver 562 may comprise any suitable receiver and may be the same as receiver 462 of network 400. Receiver 562 is operable to receive the traffic transmitted in $\lambda_v$ and process the traffic. Each filter 570 may comprise any suitable filter and may be the same as filter 470 of network 400. Each filter 570 is operable to receive the traffic in a corresponding one of $\lambda_1$-$\lambda_4$ and direct it to receiver 572. Filter 570 is further operable to pass the traffic in upstream wavelength $\lambda_u$ to corresponding filter 560 in the upstream direction. Receiver 572 may comprise any suitable receiver and may be the same as receiver 472 of network 400. Receiver 572 is operable to receive the traffic transmitted in a corresponding one of $\lambda_1$-$\lambda_v$ and process the traffic. Receiver 572 may be operable to receive traffic in any one of $\lambda_1$-$\lambda_4$, providing flexibility in assigning (or re-assigning) an ONU 550 to a particular wavelength-sharing group. Each transmitter 582 may comprise any suitable transmitter and may be the same as transmitter 482 of network 400. Transmitter 582 is operable to transmit traffic in $\lambda_u$ in the upstream direction, applying a suitable protocol to time-share $\lambda_u$ with the other ONUs 550. It should be noted that although four ONUs are illustrated as being part of a group of ONUs in HPON 500, any suitable number of ONUs may be part of a group sharing a downstream wavelength. In addition, there may be multiple groups each sharing a different a downstream wavelength (as is the case in the illustrated example). It should also be noted that any suitable number of ONUs 550 may be implemented in the network.

In operation, transmitters 504-507 and (analog video) transmitter 516 of OLT 501 may transmit traffic in $\lambda_1$-$\lambda_4$ and $\lambda_v$, respectively. Filters 508-511 receive the traffic in $\lambda_1$-$\lambda_4$, respectively, and pass the signals. Filter 508 also receives and directs the traffic in $\lambda_v$, combining it with the traffic in $\lambda_1$. As discussed above, HPON 500 is configured to include additional transmitters at transmission section 514 of OLT 501. After receiving the traffic in their corresponding wavelengths, filters 508-511 forward the corresponding signals to multiplexer 512. Multiplexer 512, combines the traffic into one signal and forwards the signal to filter 528. As discussed above, filter 528 may be in-line or may be switched out of the line, in which case the downstream signal would pass directly to filter 529. If filter 528 remains in-line, filter 528 receives the downstream signal and allows the signal to pass to filter 529. Filter 529 receives the signal and allows the signal to pass, forwarding the signal over optical fiber 530 to RN 540.

Filter 542 of RN 540 receives the signal and directs the traffic in (e.g., analog video) wavelength $\lambda_v$ to primary power splitter 548, allowing the traffic in $\lambda_1$-$\lambda_v$ to pass to multiplexer 546. Primary power splitter 548 receives the traffic in $\lambda_v$ and splits it into a suitable number of copies. In the illustrated embodiment, primary power splitter 548 splits the traffic in $\lambda_v$ into four copies, and forwards each copy to a corresponding secondary power splitter 549. Multiplexer 546 receives the signal comprising the traffic in $\lambda_1$-$\lambda_v$ and demultiplexes the signal into its constituent wavelengths. Multiplexer 546 then forwards the traffic in each wavelength along a corresponding fiber such that each secondary power splitter 549 receives the traffic in a corresponding one of $\lambda_1$-$\lambda_4$. Each secondary power splitter 549 thus receives traffic in a corresponding one of $\lambda_1$-$\lambda_v$ from multiplexer 546 and a copy of traffic in $\lambda_v$ from primary power splitter 548, combines the two wavelengths into one signal, and splits the signal into a suitable number of copies. In the illustrated embodiment, each secondary power splitter 549 splits the signal into four copies. In this way, the traffic (e.g., analog video) in wavelength $\lambda_v$ is broadcast to all ONUs 550 and a corresponding one of $\lambda_1$-$\lambda_4$ is transmitted to and shared by one or more groups of ONUs 550. It should be noted again that the groups of ONUs sharing a wavelength may be different than those illustrated in FIG. 4, and groups of wavelength-sharing ONUs may share more than one WDM wavelength in alternative networks.

After secondary power splitters 549 split the signal comprising the traffic in a corresponding one of $\lambda_1$-$\lambda_4$ and the traffic in $\lambda_v$ into four copies, secondary power splitters 549 forward each copy over fiber 530 such that the ONUs 550 coupled to the secondary power splitter 549 receive a copy. Filter 560 of each ONU 550 receives the signal and directs the traffic in $\lambda_v$ to receiver 562, which then processes the traffic carried over $\lambda_v$. Filter 560 passes the corresponding one of $\lambda_1$-$\lambda_4$ to filter 570. Filter 570 receives the traffic in the corresponding one of $\lambda_1$-$\lambda_4$ and directs the traffic to receiver 572 which then processes the traffic. Again, since each ONU 550 in a group may share one of $\lambda_1$-$\lambda_v$ with other ONUs 550 in the group, ONUs 550 must apply a suitable addressing protocol to process downstream traffic appropriately (i.e., to determine which portion of the traffic transmitted in the corresponding wavelength is destined for which ONU 550 in a group).

In the upstream direction, transmitter 582 of each ONU 550 transmits traffic in $\lambda_u$. Filters 570 and 560 receive the traffic in $\lambda_u$ and pass the traffic. The signal travels over fiber 530 to RN 540. Each secondary power splitter 549 of RN 540 receives traffic over time-shared $\lambda_u$ and combines the traffic from each ONU 550 in the corresponding group of ONUs 550. Again, since each ONU 550 transmits traffic over upstream wavelength $\lambda_u$, ONUs 550 must adhere to a suitable protocol to time-share $\lambda_u$ such that traffic from multiple ONUs does not collide. After receiving and combining traffic in $\lambda_u$ into one signal, each secondary power splitter 549 splits the signal into two copies, forwarding one copy to multiplexer 546 and one copy to primary power splitter 548. As discussed above, multiplexer 546 of example network 500 may block $\lambda_u$ or forward $\lambda_u$ to filter 542 for suitable termination (internal or external to filter 542). Primary power splitter 548 receives traffic in $\lambda_u$ from each secondary power splitter 549, combines the traffic, and forwards the traffic to filter 542. Filter 542 receives the combined traffic in $\lambda_u$ and directs the traffic toward OLT 501. Fiber 530 carries the traffic in $\lambda_u$ to filter 529 of OLT 501. Filter 529 receives the traffic in $\lambda_u$ and directs the traffic toward receiver 526. Receiver 526 receives the traffic and processes it.

As discussed above, HPON 500 is an attractive option for many network operators because it increases network capacity by introducing wavelength division multiplexing of downstream traffic without modifying ONUs 550, avoiding the cost of replacing components at each ONU and of creating substantial disruption in service. HPON 500 is also a more attractive option than other HPONs. By having groups of ONUs share downstream wavelengths, HPON 500 avoids the need for more costly optics components (that must operate under stricter conditions and that are untested and unreliable). HPON 500 thus allows for a desired increase in downstream bandwidth through WDM at a reasonable and efficient cost. As demand for bandwidth increases, it may be desirable to add additional downstream wavelengths and use the full bandwidth for digital transmission. However, using the full bandwidth in HPONs comes at a significant cost. For example, triplexers in the ONU equipment may be replaced by diplexers to support the additional wavelengths. Replacing triplexers by diplexers increases the cost of the system. Alternatively, couplers may be used to reconfigure the system to allow traffic to travel over additional wavelengths, thereby increasing the capacity of the network. However coupler based solutions are problematic because they may cause power loss.

Particular embodiments of the present invention solve this problem by replacing the analog video traffic in $\lambda_v$ with multiple downstream signals in the same band such as $\lambda_5$-$\lambda_8$. Thus, rather than replacing the triplexers with diplexers or other costly solutions, certain embodiments of the present invention may re-use triplexers to convert an analog signal to a digital signal, thereby supporting multiple downstream signals such as $\lambda_1$-$\lambda_8$. Additional details of example embodiments of the present invention are described in greater detail below.

Figure 5:
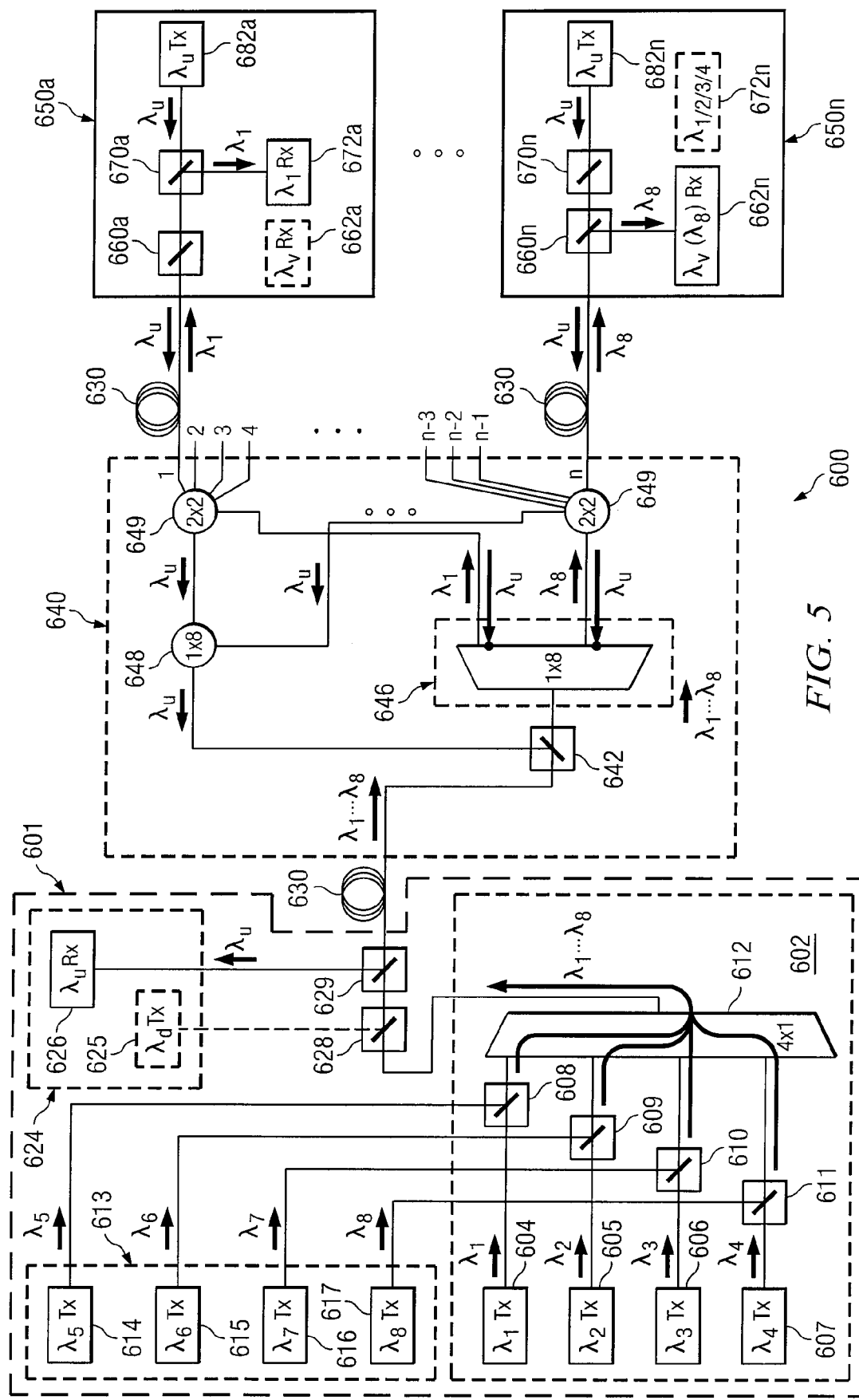
FIG. 5 is a diagram illustrating an example HPON with increased bandwidth.

FIG. 5 is a diagram illustrating an example HPON 600 with increased bandwidth. HPON 600 comprises additional transmitters that allow traffic to travel over additional wavelengths, thereby increasing the bandwidth of the network. These additional transmitters may replace transmitter 516 of FIG. 4 and may transmit in and around the same band used by transmitter 516.

Example HPON 600 comprises OLT 601, optical fiber 630, RN 640, and ONUs 650. OLT 601 (which may be an example of an upstream terminal) comprises first transmission section 602, second transmission section 613, transceiver 624, and filters 628 and 629. First transmission section 602 comprises transmitters 604-607, filters 608-611, and multiplexer 612. Transmitters 604-607 may be the same transmitters as transmitters 504-507 of FIG. 4; thus, these transmitters will not be described again. Filters 608-611 may be the same as filters 508-511 of FIG. 4; thus, these filters will also not be described again. However, it should be noted that each of filters 608-611 now receives traffic in a corresponding wavelength from a transmitter of second transmission section 613. Thus, in the illustrated embodiment, filters 608-611 receive $\lambda_1$-$\lambda_4$, respectively, and $\lambda_5$-$\lambda_8$, respectively. Multiplexer 612 may be the same as multiplexer 512 of FIG. 4; thus, multiplexer 612 will not be described. It should be noted that although eight transmitters, four filters, and one multiplexer are illustrated in example HPON 600, any suitable components may be used to forward WDM signals comprising any suitable number of wavelengths to RN 640.

Second transmission section 613 comprises additional transmitters to transmit traffic over additional wavelengths. In the illustrated example UPON, additional transmitters 614-617 transmit traffic in $\lambda_5$-$\lambda_8$, respectively. In particular example networks, transmitters 614-617 may transmit in and around the same band that the analog video signal was transmitted such that receivers 562 of network 500 may be used as receivers 662 of network 600.

Transceiver 624 may be the same as transceiver 524 of FIG. 4; thus, transceiver 624 will not be described again. Filters 628 and 629 may be the same as filters 528 and 529 of FIG. 4; however, it should be noted that filters 628 and 629 are operable to pass $\lambda_1$-$\lambda_8$ in the downstream direction, and filter 629 is operable to direct $\lambda_u$ toward receiver 626. In addition, as discussed in conjunction with filter 528 of FIG. 4, filter 628 may be switched out of the line. As discussed in conjunction with filter 529 of network 500, filter 629 may be removed in alternative networks to allow for WDM upstream.

Optical fiber 630 may comprise any suitable fiber and is operable to carry upstream and downstream traffic. In particular networks, optical fiber 630 may comprise, for example, bidirectional optical fiber. In alternative networks, optical fiber 630 may comprise two different fibers, one for upstream traffic and one for downstream traffic.

RN 640 comprises filter 642, multiplexer 646, primary power splitter 648, and secondary power splitters 649. Filter 642 may comprise any suitable filter operable to pass $\lambda_1$-$\lambda_8$ to multiplexer 646. Filter 642, in particular embodiments, no longer directs any of the downstream wavelengths toward primary power splitter 648. In example HPON 600, filter 642 continues to direct upstream wavelength $\lambda_u$ toward OLT 601. Thus, filter 642 may be the same as filter 542 of FIG. 4 in some embodiments; however, in alternative embodiments, filter 642 may replace filter 542 if filter 542 is not operable to pass $\lambda_1$-$\lambda_8$.

Multiplexer 646 demultiplexes $\lambda_5$-$\lambda_8$ in addition to $\lambda_1$-$\lambda_4$. In the illustrated embodiment, multiplexer 646 is a 1×8 multiplexer, and forwards each wavelength through a separate port such as $\lambda_1$ through the first output port and $\lambda_2$ through the second output port. In addition, multiplexer 646 may have any suitable number of ports and not necessarily the number illustrated in FIG. 5.

Primary power splitter 648 may be the same as primary power splitter 548 of FIG. 4 and thus will not be described again. However, it should be noted that, in the illustrated example, primary power splitter 648 no longer receives downstream wavelengths since downstream wavelengths $\lambda_1$-$\lambda_8$ are now all routed by multiplexer 646. However, primary power splitter 648 continues to receive and combine upstream traffic in $\lambda_u$ and forward the combined signal to OLT 601. In alternative embodiments, if a transmitter at OLT 601 transmits traffic for broadcast to all ONUs, primary power splitter 648 is operable to receive and split that signal into copies for distribution to all ONUs 650.

Secondary power splitters 649 may be the same as secondary power splitters 549 of FIG. 4 and thus will not be described again. However, it should be noted that in the downstream direction, in the illustrated example network, each secondary power splitter 649 receives traffic in a corresponding one or more of $\lambda_1$-$\lambda_8$ from multiplexer 646 and no signal from primary power splitter 648. In alternative embodiments, there may be a different number of secondary power splitters, and each secondary power splitter may receive different, less, or additional wavelengths. Each secondary power splitter 649 is operable to forward a corresponding one or more of $\lambda_1$-$\lambda_8$ to a corresponding group of ONUs 650. In this way, secondary power splitters 649 allow for wavelength-sharing among ONUs. Although secondary power splitters 649 are illustrated as 2×2 power splitters, any suitable power splitter may be used.

ONUs 650 (which may be examples of downstream terminals) may be similar to ONUs 550 of FIG. 4 at the level of detail illustrated in this figure, and thus will not be described again. However, it should be noted that in the illustrated embodiment, each ONU 650 may receive traffic in one of $\lambda_1$-$\lambda_8$. Further, although receivers 662a and 672n are illustrated with broken lines and differing connections in FIGS. 5 and in other configurations in FIGS. 7-11, it should be noted that ONUs 650a through 650n may be substantially similar models of ONUs. Filters 660 and 670 are thus operable to direct a corresponding one of $\lambda_1$-$\lambda_8$ to receivers 662 or 672, respectively. Receiver 672 is operable to receive digital data traffic in one of $\lambda_1$, $\lambda_2$, $\lambda_3$, or $\lambda_4$, as indicated by the symbol $\lambda_{1/2/3/4}$. For example, receiver 672a receives traffic in $\lambda_1$. Receiver 662 is operable to receive traffic in one of $\lambda_5$, $\lambda_6$, $\lambda_7$, or $\lambda_8$. For example, receiver 662n receives traffic in $\lambda_8$. Therefore, there is no need to replace receiver 562 since $\lambda_5$-$\lambda_8$ may be transmitted in and around the same band as $\lambda_v$. As described in more detail below, ONU 650 may be converted (from ONUs 550) to suitably process traffic in $\lambda_5$-$\lambda_8$.

In operation, transmitters 604-607 and 614-617 of OLT 601 transmit downstream traffic in $\lambda_1$-$\lambda_8$, respectively. Filters 608-611 receive $\lambda_1$-$\lambda_4$, respectively, and $\lambda_5$-$\lambda_8$, respectively, combine their respective signals, and pass the signals to multiplexer 612. For example, filter 608 receives $\lambda_1$ and $\lambda_5$, combines the two signals into one signal, and passes the signal to multiplexer 612. Multiplexer 612 combines the eight wavelengths into one signal and forwards the signal to filter 628. As discussed above, filter 628 may be in-line or may be switched out of the line, in which case the signal would pass directly to filter 629. If filter 628 remains in-line, filter 628 receives the signal from multiplexer 612 and passes the signal to filter 629. Filter 629 receives the signal and allows the signal to pass, forwarding the signal over optical fiber 630 to RN 640.

Filter 642 of RN 640 receives the downstream signal and allows the traffic in $\lambda_1$-$\lambda_8$ to pass to multiplexer 646. In the illustrated example network, traffic in all downstream wavelengths is to be routed to multiplexer 646 and not split by primary power splitter 648 for general broadcast. Thus, primary power splitter 648 of the illustrated example receives none of the traffic in the downstream wavelengths. However, in alternative example networks, power splitter 648 may continue to receive traffic in one or more downstream wavelengths for general broadcast.

Multiplexer 646 receives the signal comprising traffic in $\lambda_1$-$\lambda_8$ and demultiplexes the signal. In the illustrated example network, multiplexer 646 forwards traffic from each output port to a corresponding secondary power splitter 649. Multiple groups of ONUs may share a wavelength for reception of downstream traffic. Each secondary power splitter 649 receives a corresponding signal (in one of $\lambda_1$-$\lambda_8$) from multiplexer 646 (and no signal from primary power splitter 648) and splits the signal into a suitable number of copies. In the illustrated embodiment, each 2×2 secondary power splitter 649 splits the signal it receives from multiplexer 646 into two copies and forwards each copy to a corresponding ONU 650 over fiber 630. It should be noted again that in alternative networks, the ONUs sharing a WDM wavelength may be different than those illustrated in FIG. 5.

Each ONU 650 receives traffic in one of $\lambda_1$-$\lambda_8$ forwarded by a corresponding secondary power splitter 649. If the traffic is one of $\lambda_1$-$\lambda_4$, filter 670 may pass the traffic in the corresponding one of $\lambda_1$-$\lambda_8$ to receiver 672, which then processes the signal. Alternatively, if the traffic is one of $\lambda_5$-$\lambda_8$, filter 660 may pass the traffic in the corresponding one of $\lambda_5$-$\lambda_8$ to receiver 662, which then processes the signal.

The illustrated example HPON 600 has been shown and described as using the increased bandwidth to increase the number of groups of wavelength-sharing ONUs 650. The increased number of groups of wavelength-sharing ONUs 650 (such as, for example, from four groups to sixteen groups) may be used to allocate bandwidth more dynamically among the ONUs in each group. In some of such cases, suitable changes to the RN 640 may be necessary.

In the upstream direction, transmitter 682 of each ONU 650 transmits traffic in $\lambda_u$. Filters 670 and 660 receive and pass the traffic in $\lambda_u$. The signal travels over fiber 630 to RN 640. Each secondary power splitter 649 of RN 640 receives traffic over time-shared $\lambda_u$ and combines the traffic from each ONU 650 in the corresponding group of ONUs 650. Again, since each ONU 650 transmits traffic over upstream wavelength $\lambda_u$, ONUs 650 must adhere to a suitable protocol to time-share $\lambda_u$ such that upstream traffic from ONUs 650 does not collide. After receiving and combining the upstream traffic from the ONUs 650 in the corresponding group into one signal, each secondary power splitter 649 splits the combined signal into two copies, forwarding one copy to multiplexer 646 and one copy to primary power splitter 648. Multiplexer 646 of HPON 600 terminates $\lambda_u$ or may allow $\lambda_u$ to pass to filter 642 for suitable termination. Primary power splitter 648 receives traffic in $\lambda_u$ from each secondary power splitter 649, combines the traffic, and forwards the traffic to filter 642. Filter 642 receives the traffic in $\lambda_u$ and directs it toward OLT 601. Fiber 630 carries the traffic in $\lambda_u$ to filter 629 of OLT 601, which directs the traffic toward receiver 626. Receiver 626 receives the signal and processes it.

Modifications, additions, or omissions may be made to the example HPON 600 described without departing from the scope of the invention. The components of the HPON 600 described may be integrated or separated according to particular needs. Moreover, the operations of the HPON 600 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 6:
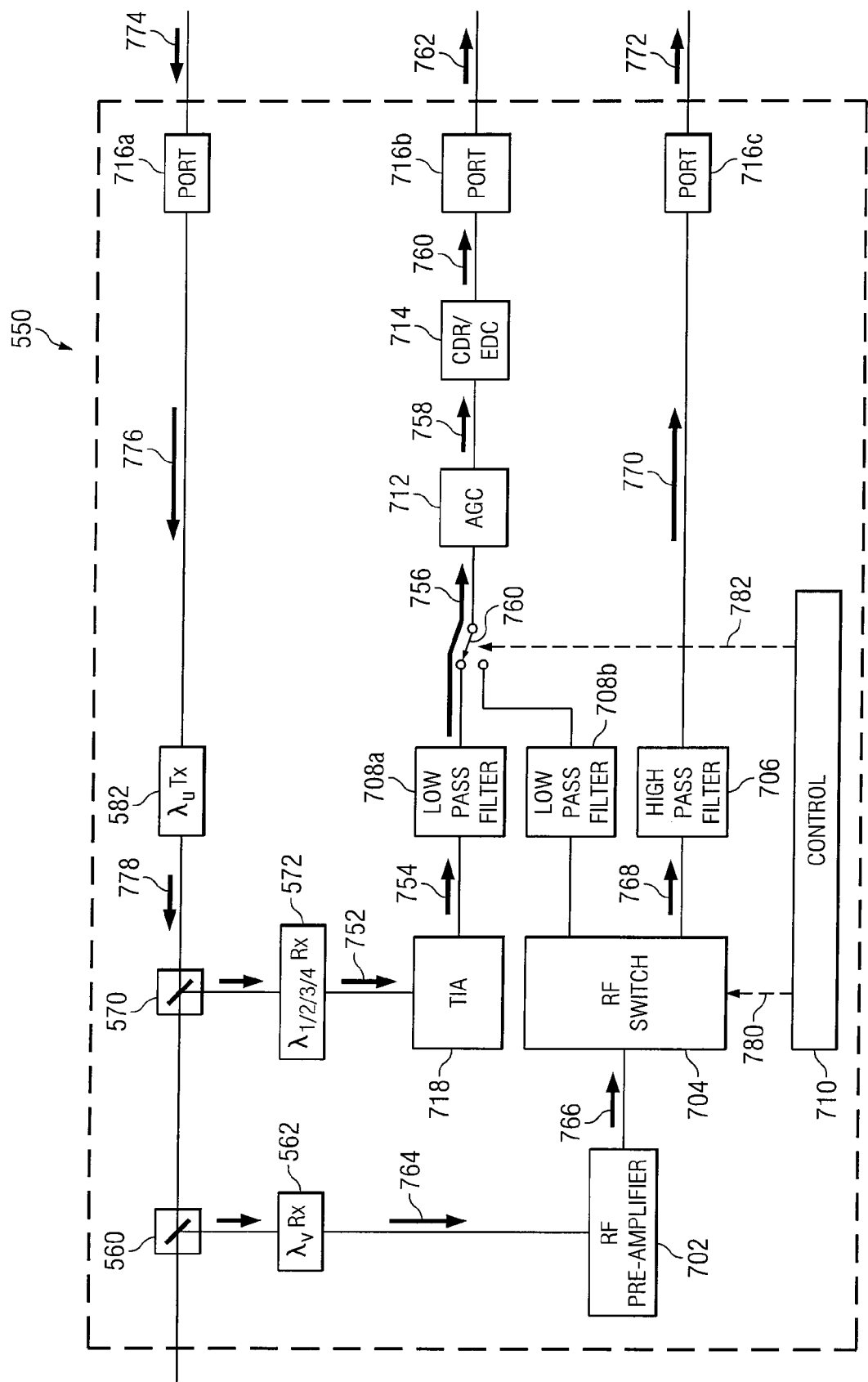
FIG. 6 is a diagram illustrating an example optical network unit (ONU) that may be implemented in the example HPON of FIG. 4.

FIG. 6 is a diagram illustrating an example ONU 550 that may be implemented in the example HPON 500 of FIG. 4 to allow for an upgrade to HPON 600 of FIG. 5. ONU 550 of FIG. 6 comprises a filter 560, receiver 562, filter 570, receiver 572, and transmitter 582. Filter 560, receiver 562, filter 570, receiver 572, transmitter 582 are described with reference to FIG. 4; thus, these components will not be described again.

ONU 550 further comprises a radio frequency (RF) pre-amplifier 702, an RF switch 704, a high pass filter 706, low pass filters 708a and 708b, a control component 710, an automatic gain control (AGC) component 712, a clock and data recovery component with electronic dispersion compensation (CDR/EDC) 714, ports 716a, 716b, and 716c, a transimpedance amplifier (TIA) 718, and a path switch 760. RF pre-amplifier 702 may comprise any suitable amplifier that is operable to amplify analog signals. RF switch 704 may comprise any suitable switch that is operable to send analog traffic to low pass filter 708b or high pass filter 706 depending on whether the signal received at receiver 562 contains analog video traffic as described in more detail below. High pass filter 706 may comprise any suitable filter that passes high frequencies, but attenuates frequencies lower than a low-threshold frequency to optimize a signal. Low pass filters 708a and 708b may comprise any suitable filters that pass low frequencies, but attenuate frequencies higher than a high-threshold frequency to optimize a signal. Control component 710 may comprise any suitable logic operable to control RF switch 704 and path switch 760 based on the signals at receivers 562 and 572. In an alternative embodiment, RF switch 704 may comprise a splitter that is operable to send a signal to low pass filter 708b and high pass filter 706, and control 710 may select a signal using path switch 760. AGC component 712 may comprise any suitable component that is operable to control the gain of ONU 550 in order to maintain a signal level. CDR/EDC component 714 may comprise any suitable component that is operable to recover data and a transmission clock from an input data stream. CDR/EDC component 714 may be further operable to convert an analog signal to a digital bit stream. CDR/EDC component 714 may be further operable to mitigate the effects of chromatic dispersion, polarization mode dispersion (PMD component imperfections, other transmission impairments and compensate for the effects of phase and amplitude differences of signals from receivers 562 and 572 by electronic filtering. Ports 716a, 716b, and 716c may comprise any suitable ports that are operable to receive upstream data, send downstream data, and send RF video data, respectively. TIA 718 may comprise any suitable component that is operable to amplify a signal. Path switch 760 may comprise any suitable switch that is operable to switch between low pass filter 708a and 708b depending on the signals received at receivers 562 and 572. As described in more detail below, high pass filter 706 and port 716c may be referred to as an analog output path for analog video traffic in $\lambda_v$ and low pass filter 708b, AGC 712, CDR/EDC 714, and port 716b may be referred to as a digital output path for traffic to be converted to digital data.

In the example embodiment, ONU 550 may receive analog video traffic in $\lambda_v$ and digital data traffic in one of $\lambda_{1/2/3/4}$. Filter 560 receives and directs any traffic in $\lambda_v$ to receiver 562. Filter 570 receives and directs any traffic in one of $\lambda_{1/2/3/4}$ to receiver 572. Thus, receiver 562 and receiver 572 may receive traffic in $\lambda_v$ and one of $\lambda_{1/2/3/4}$, respectively. After receiving the analog video traffic in $\lambda_v$, receiver 562 sends the corresponding signal to RF pre-amplifier 702, as indicated by reference number 764. RF pre-amplifier 702 amplifies the video signal and sends it to RF switch 704, as indicated by reference number 766. As indicated by reference number 780, control component 710 configures RF switch 704 to send the signal to an analog output path comprising high pass filter 706, as indicated by reference number 768. RF switch 704 is so configured because control component 710 determines that analog video traffic is being received. After processing at high pass filter 706, the signal is sent through the analog output path to port 716c, as indicated by reference number 770. As indicated by reference number 772, port 716c sends the signal as RF video downstream data.

After receiver 572 receives data traffic in one of $\lambda_{1/2/3/4}$, receiver 572 sends the signal to TIA 718, as indicated by reference number 752. TIA 718 amplifies the signal and sends the signal to low pass filter 708a, as indicated by reference number 754. As indicated by reference number 782, control 710 configures path switch 760 to connect to low pass filter 708a because ONU 550 receives digital data traffic in one of $\lambda_{1/2/3/4}$. That traffic is sent to AGC component 712, as indicated by reference number 756. After processing at AGC component 712, the signal is sent to CDR/EDC component 714. CDR/EDC component 714 recovers data from the input signal in the form of a digital bit stream and sends the data to port 716b, as indicated by reference number 760. As indicated by reference number 762, port 716b sends the digital bit stream as downstream data.

In the upstream direction, transmitter 582 of ONU 550 receives the traffic in $\lambda_u$ from port 716a, as indicated by reference number 776, and transmitter 582 transmits the traffic in $\lambda_u$, as indicated by reference number 778. Thus, the analog video traffic in wavelength $\lambda_v$ is received by ONU 550 and data traffic in one of $\lambda_{1/2/3/4}$ is received and shared by one or more groups of ONUs 550. However, it may be desirable to increase bandwidth by transmitting additional downstream signals such as $\lambda_5$-$\lambda_8$. Particular embodiments of the present invention increase bandwidth by replacing the analog video traffic in $\lambda_v$ with multiple downstream signals such as $\lambda_5$-$\lambda_8$. Although not used in typical operation of ONU 550, RF switch 704 and low pass filter 708b of ONU 550 may be used to facilitate the upgrade of HPON 500 to HPON 600, essentially converting the triplexers to diplexers. Additional details of example embodiments of the present invention are described in greater detail below with reference to FIGS. 7-11.

Figure 7:
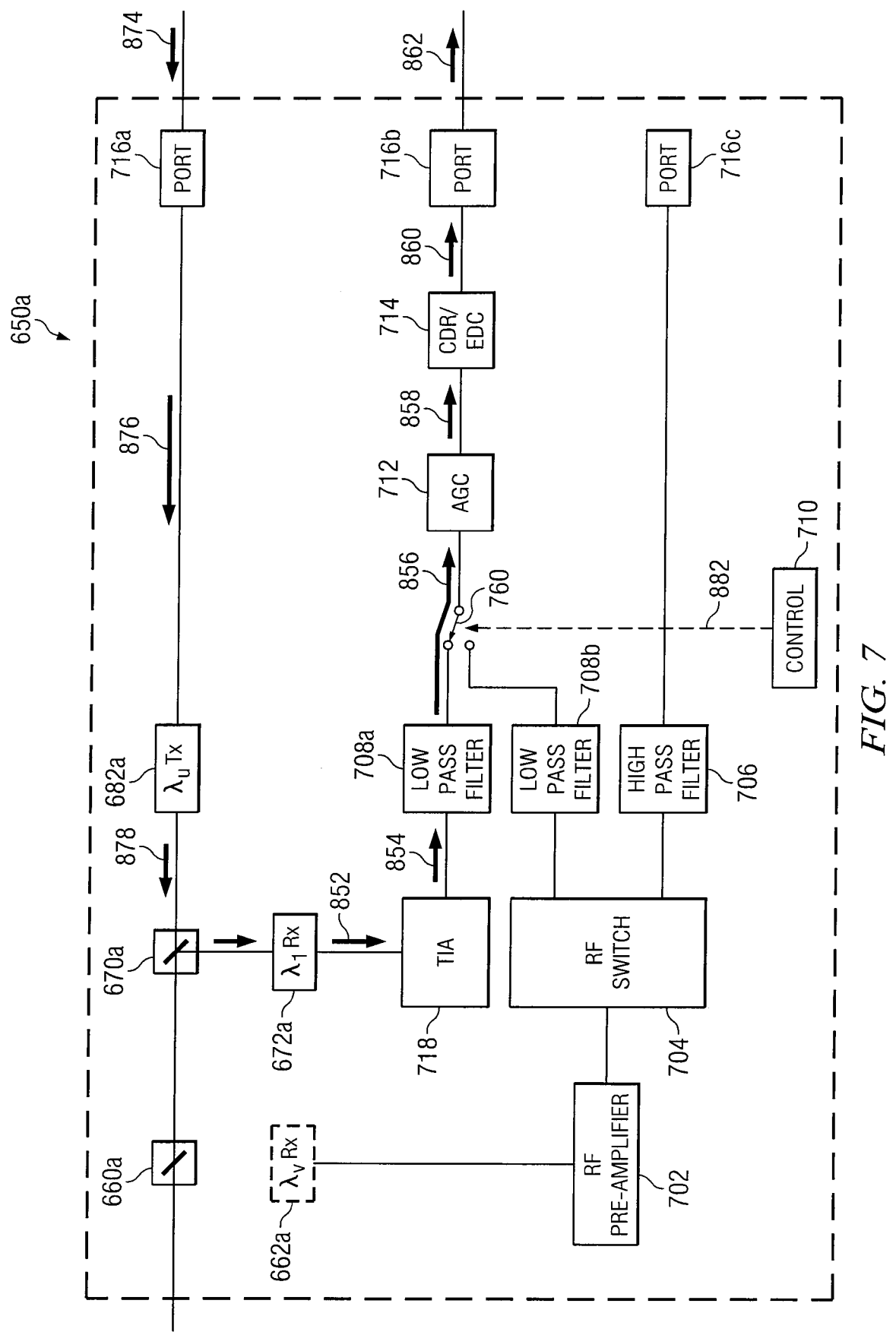
FIG. 7 is a diagram illustrating an example ONU that may be implemented in the example HPON of FIG. 5.

FIG. 7 is a diagram illustrating an example ONU 650a that may be implemented in the example HPON 600 of FIG. 5. As described in FIG. 5, ONU 650a receives traffic in $\lambda_1$. ONU 650a of FIG. 7 comprises filter 660a, receiver 662a, filter 670a, receiver 672a, and transmitter 682a that have been described with reference to FIG. 5; thus, these components will not be described again. ONU 650a further comprises RF pre-amplifier 702, RF switch 704, high pass filter 706, low pass filters 708a and 708b, control component 710, AGC component 712, CDR/EDC component 714, ports 716a, 716b, and 716c, TIA 718, and path switch 760 that have been described with reference to FIG. 6; thus, these components will not be described again.

Figure 8:
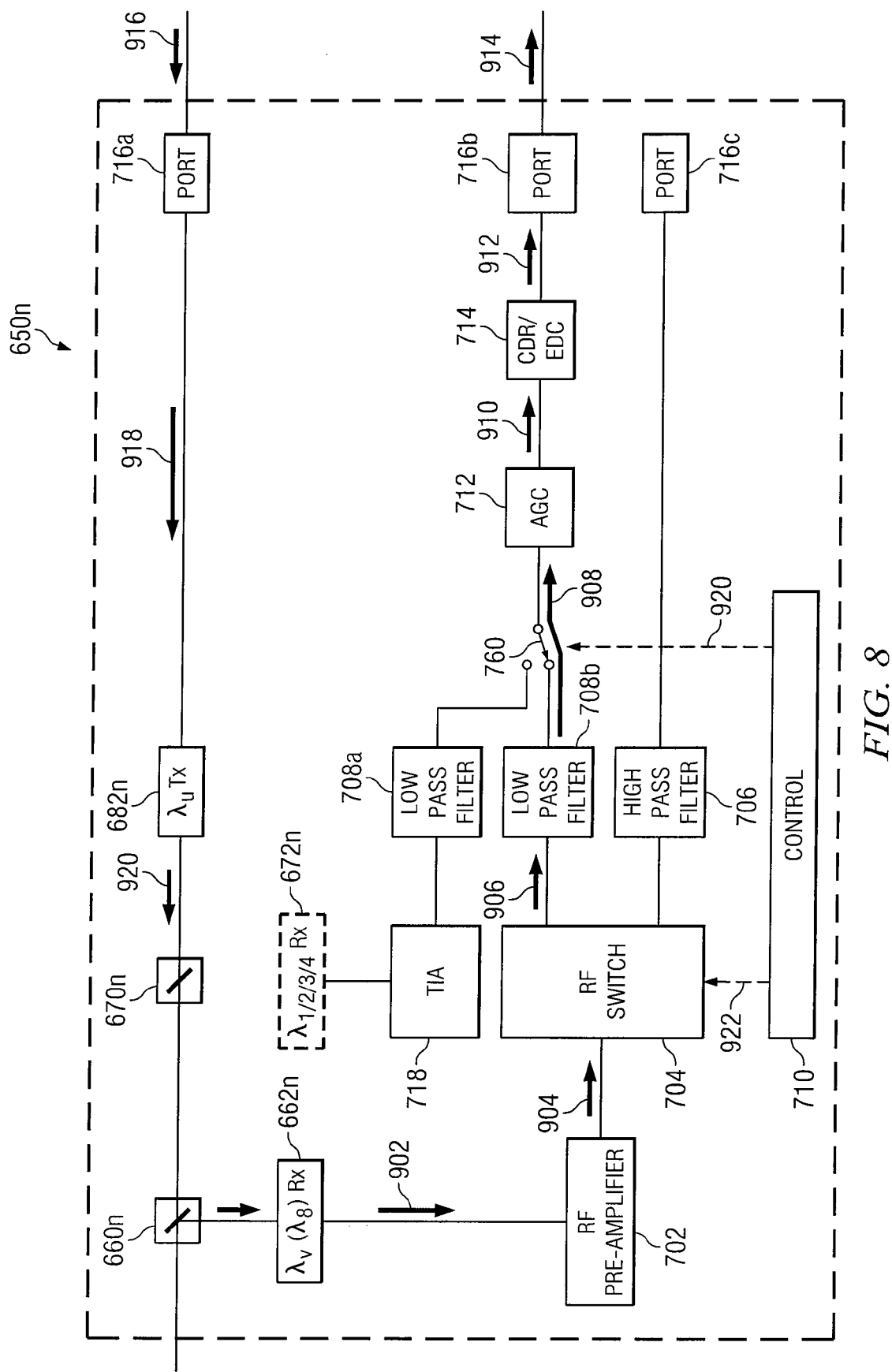
FIG. 8 is a diagram illustrating an example ONU of FIG. 5 that converts analog data to digital data using a shared clock and data recovery component with electronic dispersion compensation (CDR/EDC)

As noted above in FIG. 5, analog video traffic in $\lambda_v$ is not transmitted in HPON 600. Instead, a signal is transmitted in each of $\lambda_1$-$\lambda_8$ (with $\lambda_5$-$\lambda_8$ using the waveband of $\lambda_v$). For example, a signal in $\lambda_1$ is received at ONU 650a. As another example, a signal in $\lambda_8$ is received at ONU 650n. However, each ONU 650 may receive traffic in a corresponding one of $\lambda_1$-$\lambda_8$. Further, groups of multiple ONUs may share a wavelength for reception of downstream traffic. In the illustrated embodiment, filter 670a is operable to direct $\lambda_1$ to receiver 672a, which then processes the signal and sends the signal to TIA 718, as indicated by reference number 852. TIA 718 sends the signal to low pass filter 708a, as indicated by reference number 854. Because ONU 650a does not receive traffic in $\lambda_5$-$\lambda_8$, control component 710 configures path switch 760 to connect to low pass filter 708a, allowing low pass filter 708a to send the signal to AGC component 712, as indicated by reference number 856. FIG. 8 illustrates what happens when traffic is received in one of $\lambda_{5/6/7/8}$. Referring back to FIG. 7, AGC component 712 forwards the signal to CDR/EDC component 714, as indicated by reference number 858. CDR/EDC component 714 recovers data from the input signal as a digital bit stream and sends the digital bit stream to port 716b, as indicated by reference number 860. As indicated by reference number 862, port 716b sends the digital bit stream as downstream data.

In the upstream direction, transmitter 682a of ONU 650a receives the traffic in $\lambda_u$ from port 716a, as indicated by reference number 876, and transmitter 682a transmits the traffic in $\lambda_u$, as indicated by reference number 878. Thus, ONU 650a is converted from a triplexer handling three wavelengths ($\lambda_1$, $\lambda_v$, and $\lambda_u$) to a diplexer handling two wavelengths ($\lambda_1$ and $\lambda_u$). Converting ONUs 650 from triplexers to diplexers allows ONUs to support additional downstream signals such as $\lambda_5$-$\lambda_8$ as described below in FIG. 8.

FIG. 8 is a diagram illustrating an example ONU 650n of FIG. 5 that converts analog data to digital data using a shared clock and data recovery component with electronic dispersion compensation (CDR/EDC) 714. As described in FIG. 5, ONU 650n receives traffic in $\lambda_8$. ONU 650n of FIG. 8 comprises filter 660n, receiver 662n, filter 670n, receiver 672n, and transmitter 682n that have been described with reference to FIG. 5; thus, these components will not be described again. ONU 650n further comprises RF pre-amplifier 702, RF switch 704, high pass filter 706, low pass filters 708a and 708b, control component 710, AGC component 712, CDR/EDC component 714, ports 716a, 716b, and 716c, TIA 718, and path switch 760 that have been described with reference to FIG. 6; thus, these components will not be described again.

ONU 650n of FIG. 8 is similar to ONU 650a of FIG. 7 except ONU 650n receives a different wavelength $\lambda_8$. Since $\lambda_5$-$\lambda_8$ are transmitted in and around the same band as $\lambda_v$, the downstream signal $\lambda_8$ is received in place of $\lambda_v$ at ONU 650n. In the illustrated embodiment, filter 660n is operable to direct $\lambda_8$ to receiver 662n, which then processes the signal and sends the signal to RF pre-amplifier 702, as indicated by reference number 902. RF pre-amplifier 702 amplifies the signal and sends it to RF switch 704, as indicated by reference number 904. Because the received signal $\lambda_8$ is to be converted to a digital bit stream (it does not contain analog video traffic in $\lambda_v$), control component 710 configures RF switch 704 to send the signal to a digital output path comprising low pass filter 708b, as indicated by reference number 906. Control component 710 further configures path switch 760 to connect to low pass filter 708b to allow low pass filter 708b to send the signal along the digital output path to AGC component 712, as indicated by reference number 908. AGC component 712 sends the signal to CDR/EDC component 714, as indicated by reference number 910. CDR/EDC component 714 converts the signal to a digital bit stream and sends the digital bit stream to port 716b, as indicated by reference number 912. As indicated by reference number 914, port 716b sends the digital bit stream as downstream data.

In the upstream direction, transmitter 682n of ONU 650n receives the traffic in $\lambda_u$ from port 716a, as indicated by reference number 918, and transmitter 682n transmits the traffic in $\lambda_u$, as indicated by reference number 920. Thus, ONU 650n is converted from a triplexer handling three wavelengths ($\lambda_8$, $\lambda_v$, and $\lambda_u$) to a diplexer handling two wavelengths ($\lambda_8$ and $\lambda_u$). Since $\lambda_5$-$\lambda_8$ are transmitted in and around the same band as $\lambda_v$, receivers 662 may be operable to receive the signal carried in $\lambda_5$-$\lambda_8$ and ONU 650n may process the signal carried in $\lambda_5$-$\lambda_8$. As described in FIG. 7 and FIG. 8, ONUs 650 may be configured to be able to receive and process data in $\lambda_5$-$\lambda_8$. As described in more detail below with reference to FIGS. 9-11, ONUs 650 may be configured in numerous ways to suitably process data carried in $\lambda_5$-$\lambda_8$.

Figure 9:
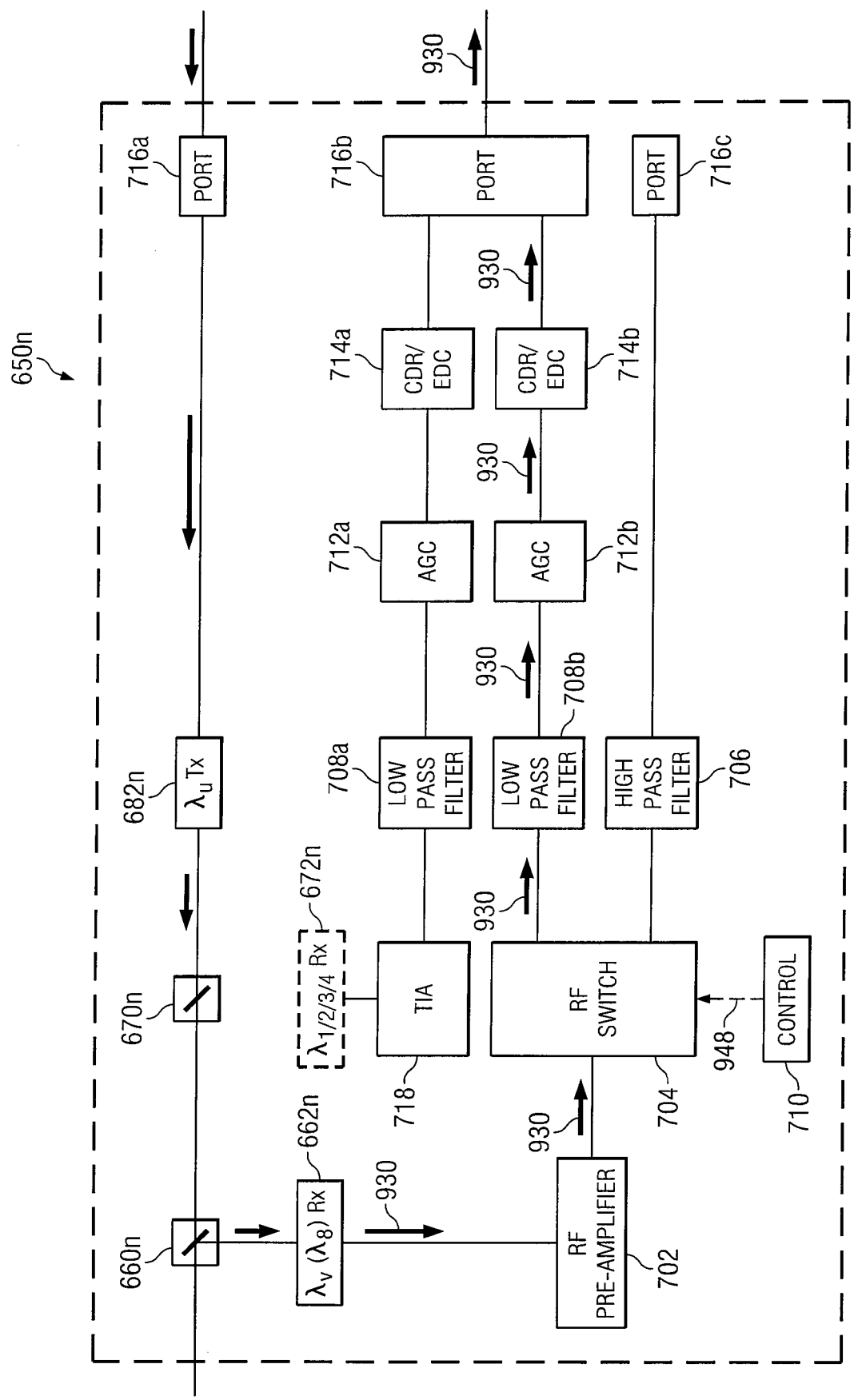
FIG. 9 is a diagram illustrating an example ONU of FIG. 5 that converts analog data to digital data using a separate CDR/EDC component.

FIG. 9 is a diagram illustrating an example ONU 650n of FIG. 5 that converts analog data to digital data using a separate CDR/EDC component 714b. ONU 650n of FIG. 9 comprises filter 660n, receiver 662n, filter 670n, receiver 672n, and transmitter 682n that have been described with reference to FIG. 5; thus, these components will not be described again. ONU 650n further comprises RF pre-amplifier 702, RF switch 704, high pass filter 706, low pass filters 708a and 708b, control component 710, AGC components 712a and 712b, CDR/EDC components 714a and 714b, ports 716a, 716b, and 716c, and TIA 718 that have been described with reference to FIG. 6; thus, these components will not be described again.

Because the received signal in $\lambda_8$ is to be converted to a digital bit stream (it does not contain analog video traffic in $\lambda_v$), control component 710 configures RF switch 704 to send the signal to the digital output path through low pass filter 708b, as indicated by reference number 648. ONU 650n of FIG. 9 does not have a path switch, but instead has a separate AGC component 712b and CDR/EDC component 714b to convert the signal to a digital bit stream and send the digital bit stream to port 716b, as indicated by reference number 930.

Figure 10:
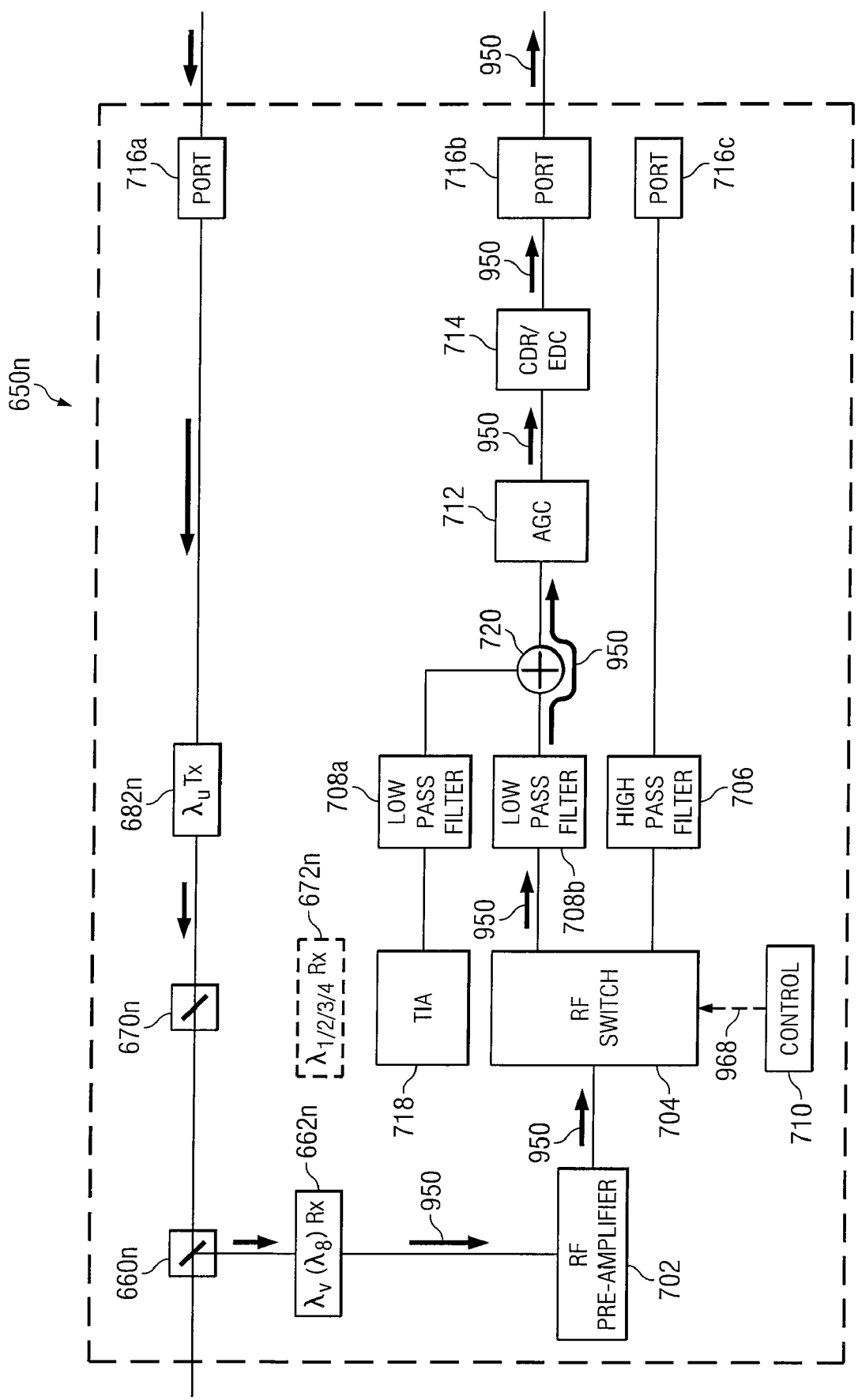
FIG. 10 is a diagram illustrating an example ONU of FIG. 5 with an adder component that converts analog data to digital data using a shared CDR/EDC component.

FIG. 10 is a diagram illustrating an example ONU 650n of FIG. 5 with an adder component 720 that converts analog data to digital data using a shared CDR/EDC component 714. ONU 650n of FIG. 10 comprises filter 660n, receiver 662n, filter 670n, receiver 672n, and transmitter 682n that have been described with reference to FIG. 5; thus, these components will not be described again. ONU 650n further comprises RF pre-amplifier 702, RF switch 704, high pass filter 706, low pass filters 708a and 708b, control component 710, AGC component 712, CDR/EDC component 714, ports 716a, 716b, and 716c, and TIA 718 that have been described with reference to FIG. 6; thus, these components will not be described again.

Because the received signal in $\lambda_8$ is to be converted to a digital bit stream (it does not contain analog video traffic in $\lambda_v$), control component 710 configures RF switch 704 to send the signal to the digital output path through low pass filter 708b, as indicated by reference number 968. ONU 650n of FIG. 10 does not have a path switch, but instead has adder component 720. Adder component 720 may comprise any suitable component that is operable to combine any received data from one or more of a plurality of inputs, such as from receivers 662 and 672. It should be noted that although the illustrated embodiment shows only one downstream signal, as indicated by reference number 950, any suitable number of downstream signals may be combined by adder component 720 for a particular wavelength. For example, adder component 720 may receive one signal from low pass filter 708b, as shown in the illustrated embodiment, and may receive noise or no signal from low pass filter 708a. If noise or no signal is received from low pass filter 708a, adder component 720 may forward the received signal from low pass filter 708b and not forward the input from low pass filter 708a. As another example, if a downstream wavelength between $\lambda_v$ and $\lambda_5$ is received and is simultaneously received by both receivers 662 and 672 and as a result a signal is received from both low pass filter 708a and 708b, by combining any received data, the power decrease experienced by the optical signals arriving at receivers 662 and 672, due to a proximity to edges of wavelength bands of one or both of filters 660 and 670 is mitigated. Thus, adder component 720 may reduce the impact of the loss of power at the transition region between the two wavelength bands including $\lambda_1$-$\lambda_4$ and $\lambda_5$-$\lambda_8$. CDR/EDC component 714 compensates for the phase difference of signals from receivers 662 and 672 and converts the output signal from analog to digital and sends the data to port 716b.

Figure 11:
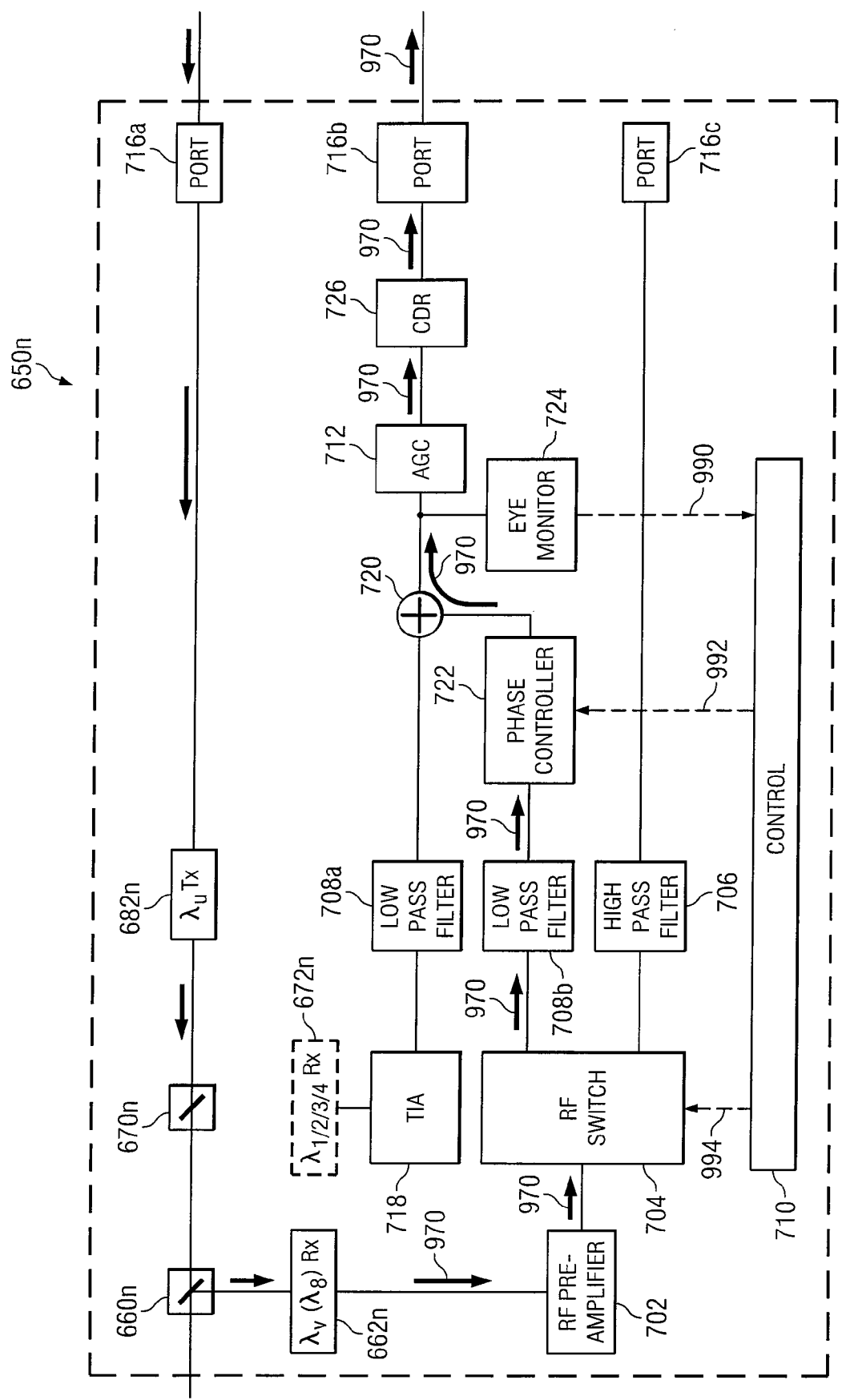
FIG. 11 is a diagram illustrating an example ONU of FIG. 5 that compensates for the phase and amplitude difference of signals using a phase controller and an eye monitor.

FIG. 11 is a diagram illustrating an example ONU 650n of FIG. 5 that compensates for the phase and amplitude difference of signals using a phase controller 722 and an eye monitor 724. ONU 650n of FIG. 11 comprises filter 660n, receiver 662n, filter 670n, receiver 672n, and transmitter 682n that have been described with reference to FIG. 5; thus, these components will not be described again. ONU 650n further comprises RF pre-amplifier 702, RF switch 704, high pass filter 706, low pass filters 708a and 708b, control component 710, AGC component 712, CDR/EDC component 714, ports 716a, 716b, and 716c, and TIA 718 that have been described with reference to FIG. 6; thus, these components will not be described again.

Because the received signal in $\lambda_8$ is to be converted to a digital bit stream (it does not contain analog video traffic in $\lambda_v$), control component 710 configures RF switch 704 to send the signal to the digital output path through low pass filter 708b, as indicated by reference number 994. ONU 650n of FIG. 11 does not have a path switch, but instead has adder component 720. As described above, adder component 720 may add the signals from receivers 662 and 672. ONU 650n does not have a CDR/EDC component to compensate for the phase difference of signals from receivers 662 and 672. Instead, ONU 650n has a CDR component 726 where EDC is not available. Thus, ONU 650n has phase controller 722 and eye monitor 724. Phase controller 722 may comprise any suitable component that is operable to align phases of signals by adjusting the phases in response to control module 710, as indicated by reference number 992. Eye monitor 724 may comprise any suitable component that is operable to monitor the signal output from adder component 720 and maximize the signal amplitude through control component 710, as indicated by reference number 990. In alternative embodiments, eye monitor 724 may monitor the signal output from AGC component 712 and maximize the signal amplitude through control component 710. Again, it should be noted that although the illustrated embodiment shows only one downstream signal, as indicated by reference number 970, any suitable number of downstream wavelengths may be added by adder component 720.

Thus, as described above with reference to FIGS. 9-11, ONUs 650 may be configured in numerous ways to suitably process data carried in $\lambda_5$-$\lambda_8$. It should be noted that although FIGS. 9-11 describe ONU 650n and downstream wavelength $\lambda_8$, the configurations may be used for other ONUs 650 and other wavelengths.

As can be seen from the above description of FIGS. 5-11, as demand for bandwidth increases, it may be possible to convert triplexers that support RF analog video to diplexers to support additional wavelengths. Unlike costly solutions that simply replace hardware or use couplers to reconfigure traffic to travel over additional wavelengths, example embodiments of the present invention re-use triplexers and replace the analog video traffic in $\lambda_v$ with multiple downstream signals in the same band such as $\lambda_5$-$\lambda_8$, thereby increasing network capacity over existing networks.

Although the present invention has been described with several embodiments, various changes and modifications may be suggested to one skilled in the art. It is intended that the present invention encompass such changes and modifications as fall within the scope of the appended claims.

What is claimed is:

1. A method for increasing downstream bandwidth in an optical network, comprising:
    providing a downstream terminal comprising a digital output path and an analog output path, the digital output path comprising one or more components configured to alter digital signals and the analog output path comprising one or more components configured to alter analog signals, the one or more components of the digital output path comprising a low pass filter and the one or more components of the analog output path comprising a high pass filter;
    receiving a signal comprising at least one wavelength at the downstream terminal; and
    selectively processing the signal at the downstream terminal based on a determination of whether the signal is an analog signal or a digital signal, wherein selectively processing the signal at the downstream terminal comprises switching the signal to the analog output path if the signal comprises analog video data and switching the signal to the digital output path if the signal comprises data to be converted to a digital bit stream.

2. The method of claim 1, wherein selectively processing the signal at the downstream terminal comprises configuring a switch of the downstream terminal based on a pre-determination of whether the signal comprises analog video traffic or data traffic, the switch configured to forward the signal to either the analog output path or the digital output path.

3. The method of claim 1, wherein selectively processing the signal at the downstream terminal comprises:
    determining whether the signal comprises analog video traffic or data traffic; and selecting between the digital output path and the analog output path at a switch of the downstream terminal based on the determination.

4. The method of claim 1, further comprising:
receiving the at least one wavelength at one or more of a plurality of inputs of an adder component; and
combining any received data from the one or more inputs at the adder component.

5. The method of claim 1, further comprising generating the digital bit stream from the signal with one or more clock and data recovery components on the digital output path.

6. The method of claim 5, further comprising aligning a phase and an amplitude of the at least one wavelength with electronic dispersion compensation at the one or more clock and data recovery components.

7. The method of claim 5, further comprising aligning a phase and an amplitude of the at least one wavelength with a phase controller and an eye monitor, wherein the phase controller is operable to align the phase of the at least one wavelength, and wherein the eye monitor is operable to align the amplitude of the at least one wavelength.

8. A downstream terminal for an optical network, comprising:
a digital output path comprising one or more components configured to alter digital signals, the one or more components of the digital output path comprising a low pass filter;
an analog output path comprising one or more components configured to alter analog signals, the one or more components of the analog output path comprising a high pass filter; and
at least one receiver coupled to the digital output path and the analog output path, the at least one receiver operable to receive a signal comprising at least one wavelength at the downstream terminal; and
wherein the downstream terminal is operable to selectively process the signal at the downstream terminal based on a determination of whether the signal is an analog signal or a digital signal by switching the signal to the analog output path if the signal comprises analog video data and switching the signal to the digital output path if the signal comprises data to be converted to a digital bit stream.

9. The downstream terminal of claim 8, further comprising a switch, the switch configured to forward the signal to either the analog output path or the digital output path based on a pre-determination of whether the signal comprises analog video traffic or data traffic.

10. The downstream terminal of claim 8, further comprising a control component, the control component operable to:
determine whether the signal comprises analog video traffic or data traffic; and
select between the digital output path and the analog output path at a switch of the downstream terminal based on the determination.

11. The downstream terminal of claim 8, further comprising an adder component, the adder component operable to:
receive the at least one wavelength at one or more of a plurality of inputs of the adder component; and
combine any received data from the one or more inputs.

12. The downstream terminal of claim 8, further comprising one or more clock and data recovery components on the digital output path, the one or more clock and data recovery components on the digital output path operable to generate the digital bit stream from the signal.

13. The downstream terminal of claim 12, wherein the one or more clock and data recovery components are further operable to align a phase and an amplitude of the at least one wavelength with electronic dispersion compensation.

14. The downstream terminal of claim 12, further comprising a phase controller and an eye monitor, wherein the phase controller is operable to align the phase of the at least one wavelength, and wherein the eye monitor is operable to align the amplitude of the at least one wavelength.

15. A system for increasing downstream bandwidth in an optical network comprising a downstream terminal for an optical network, the downstream terminal comprising:
a digital output means configured to alter digital signals, the digital output means comprising a low pass filter;
an analog output means configured to alter analog signals, the analog output means comprising a high pass filter; and
at least one receiver coupled to the digital output means and the analog output means, the at least one receiver operable to receive a signal comprising at least one wavelength at the downstream terminal; and
means for selectively processing the signal at the downstream terminal based on a determination of whether the signal is an analog signal or a digital signal, wherein selectively processing the signal at the downstream terminal comprises switching the signal to the analog output means if the signal comprises analog video data and switching the signal to the digital output means if the signal comprises data to be converted to a digital bit stream.

16. The system of claim 15, wherein the downstream terminal further comprises means for forwarding the signal to either the analog output means or the digital output means based on a pre-determination of whether the signal comprises analog video traffic or data traffic.

17. The system of claim 15, wherein the downstream terminal further comprises means for:
determining whether the signal comprises analog video traffic or data traffic; and
selecting between the digital output means and the analog output means based on the determination.

18. The system of claim 15, wherein the downstream terminal further comprises means for:
receiving the at least one wavelength at one or more of a plurality of inputs; and
combining any received data from the one or more inputs.

19. The system of claim 15, wherein the downstream terminal further comprises means for aligning a phase and an amplitude of the at least one wavelength.

20. The system of claim 19, wherein the means for aligning a phase and an amplitude of the at least one wavelength further comprises means for aligning a phase and an amplitude of the at least one wavelength with electronic dispersion compensation.

* * * * *